US011443072B2

(12) United States Patent
Volos et al.

(10) Patent No.: US 11,443,072 B2
(45) Date of Patent: Sep. 13, 2022

(54) PERIPHERAL DEVICE WITH RESOURCE ISOLATION

(71) Applicant: Microsoft Technology Licensing, LLC, Redmond, WA (US)

(72) Inventors: Stavros Volos, Bellevue, WA (US); Kapil Vaswani, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 541 days.

(21) Appl. No.: 16/023,965

(22) Filed: Jun. 29, 2018

(65) Prior Publication Data
US 2020/0004993 A1 Jan. 2, 2020

(51) Int. Cl.
G06F 21/00 (2013.01)
G06F 21/73 (2013.01)
G06F 9/4401 (2018.01)
G06F 21/80 (2013.01)

(52) U.S. Cl.
CPC ............ G06F 21/73 (2013.01); G06F 9/4413 (2013.01); G06F 21/805 (2013.01)

(58) Field of Classification Search
None
See application file for complete search history.

(56) References Cited

U.S. PATENT DOCUMENTS

| 8,832,813 | B1 | 9/2014 | Cai et al. | |
| 10,367,639 | B2* | 7/2019 | Vembu | H04L 9/14 |
| 11,018,863 | B2* | 5/2021 | Vembu | G06F 21/74 |
| 2005/0125681 | A1 | 6/2005 | Bressy et al. | |
| 2013/0151846 | A1 | 6/2013 | Baumann et al. | |
| 2014/0101734 | A1* | 4/2014 | Ronda | G06F 21/6227 726/5 |
| 2014/0189690 | A1* | 7/2014 | Ramakrishnan Nair | G06F 9/4555 718/1 |
| 2016/0188251 | A1* | 6/2016 | Dunning | G06F 12/109 711/165 |
| 2017/0039396 | A1* | 2/2017 | Sharp | G06F 21/10 |

(Continued)

FOREIGN PATENT DOCUMENTS

DE 102013213314 A1 1/2015
EP 2791817 A1 10/2014

OTHER PUBLICATIONS

"Final Office Action issued in U.S. Appl. No. 16/166,047", dated Feb. 8, 2021, 12 Pages.

(Continued)

Primary Examiner — Jeffery L Williams
(74) Attorney, Agent, or Firm — Schwegman Lundberg & Woessner, P.A.

(57) ABSTRACT

A peripheral device package for use in a host computing device has a plurality of compute elements and a plurality of resources shared by the plurality of compute elements. A datastructure is stored in a hidden memory of the peripheral device package. The data structure holds metadata about ownership of resources of the peripheral device package by a plurality of user runtime processes of the host computing device which use the compute elements. At least one of the user runtime processes is a secure user runtime process. The peripheral device package has a command processor configured to use the datastructure to enforce isolation of the resources used by the secure user runtime process.

20 Claims, 19 Drawing Sheets

(56) References Cited

U.S. PATENT DOCUMENTS

| | | | |
|---|---|---|---|
| 2017/0329623 A1* | 11/2017 | Dong | G06T 1/20 |
| 2018/0089794 A1* | 3/2018 | Gopalakrishnan | G06F 21/62 |
| 2018/0173645 A1* | 6/2018 | Parker | G06F 12/1036 |
| 2018/0288097 A1 | 10/2018 | Poornachandran et al. | |
| 2019/0012489 A1* | 1/2019 | Gligor | G06F 9/45508 |
| 2020/0004993 A1 | 1/2020 | Volos et al. | |
| 2020/0125772 A1 | 4/2020 | Volos et al. | |
| 2021/0342492 A1 | 11/2021 | Volos et al. | |

OTHER PUBLICATIONS

"AMD Radeon RX 300 series", Retrieved From: https://en.wikipedia.org/wiki/AMD_Radeon_Rx_300_series, Jan. 1, 2016, 6 Pages.

Adriaens, et al., "The case for GPGPU spatial multitasking", Published in: 2012 IEEE 18th International Symposium on High Performance Computer Architecture (HPCA), Feb. 29, 2012, 12 Pages.

Arnautov, et al., "SCONE: Secure Linux Containers with Intel SGX", In Proceedings of the 12th USENIX Conference on Operating Systems Design and Implementation, Nov. 2, 2016, pp. 689-703.

Bertoni, et al., "Keccak and the SHA-3", Submission to NIST, Feb. 2013, 71 Pages.

Black, et al., "The pricing of options and corporate liabilitie", In Journal of Political Economy, vol. 81, Issue 3, May 1, 1973, pp. 637-654.

Boivie, et al., "Secureblue++: Cpu support for secure execution", IBM Research Division, RC25287 (WAT1205-070) (2012): May 23, 2012, 10 Pages.

Brasser, et al., "Software Grand Exposure: SGX Cache Attacks Are Practical", In Journal of Computing Research Repository, Feb. 2017, pp. 11-11.

Buck, Ian., "Nvidia's next-gen Pascal GPU architecture to provide 10x speedup for deep learning apps", Retrieved from: https://blogs.nvidia.com/blog/2015/03/17/pascal/, Mar. 17, 2015, 4 Pages.

Che, et al., "Graphenesgx: A practical library os for unmodified applications on sgx", In Proceedings of USENIX Annual Technical Conference, Jul. 12, 2017, 15 Pages.

Chen, et al., "Detecting Privileged Side-Channel Attacks in Shielded Execution with D'eJ'a Vu", In Proceedings of the ACM on Asia Conference on Computer and Communications Security, Apr. 2, 2017, pp. 7-18.

Costan, et al., "Sanctum: Minimal hardware extensions for strong software isolation", In Proceedings of 25th USENIX Security Symposium, Aug. 10, 2016, pp. 857-874.

Diamos, et al., "Ocelot: A dynamic optimization framework for bulk-synchronous applications in heterogeneous systems", In Proceedings of 19th International Conference on Parallel Architecture and Compilation Techniques, Sep. 11, 2010, 12 Pages.

Evtyushkin, et al., "Iso-X: A Flexible Architecture for Hardware-Managed Isolated Execution", In Proceedings of 47th Annual IEEE/ACM International Symposium on Microarchitecture, Dec. 13, 2014, 13 pages.

Gabe Knuth, "NVIDIA, AMD, and Intel: How they do their GPU virtualization", Retrieved From: https://www.brianmadden.com/opinion/NVIDIA-AMD-and-Intel-How-they-do-their-GPU-virtualization, Sep. 26, 2016, 7 Pages.

Hardavellas, et al., "Toward dark silicon in servers", In Proceedings of IEEE Micro, vol. 31, No. 4, Jul. 4, 2011, pp. 6-15.

Hofmann, et al., "Inktag: secure applications on an untrusted operating system", In Proceedings of International Conference on Architectural Support for Programming Languages and Operating Systems, Mar. 16, 2013, pp. 265-278.

Jia, et al., "Caffe: Convolutional Architecture for Fast Feature Embedding", In Proceedings of the 22nd ACM International conference on Multimedia, Nov. 3, 2014, 4 Pages.

Jouppi, et al., "In-Datacenter performance analysis of a tensor processing unit", In Proceedings of the 44th Annual International Symposium on Computer Architecture, Jun. 24, 2017, pp. 1-12.

Kato, et al., "Gdev: First-class GPU resource management in the operating system", In USENIX Conference on Annual Technical Conference, 2012, 12 Pages.

Lee, et al., "Stealing webpages rendered on your browser by exploiting gpu vulnerabilities.", In Proceedings of 2014 IEEE Symposium on Security and Privacy, Jan. 2014, 15 Pages.

Lie, et al., "Architectural support for copy and tamper resistant software.", In proceedings of ACM SIGPLAN Notices 35.11 (2000): 168-177, 2000, 10 Pages.

Maurice, et al., "Confidentiality issues on a gpu in a virtualized environment", In International Conference on Financial Cryptography and Data Security. Springer, Berlin, Heidelberg., Nov. 9, 2014, 17 Pages.

McCune, et al., "TrustVisor: Efficient TCB Reduction and Attestation", In Symposium on Security and Privacy, May 16, 2010, pp. 143-158.

McGrath, D., "Altera readies FPGAs with inpackage memory", Retrieved From: https://www.eetimes.com/document.asp?doc_id=1328233, 2015, 3 Pages.

McKeen, F, et al., "Innovative Instructions and Software Model for Isolated Execution", In Proceedings of the 2nd International Workshop on Hardware and Architectural Support for Security and Privacy, HASP, 2013, 8 Pages.

Nouveau, "Accelerated open source driver for NVIDIA cards", Retrieved From: https://nouveau.freedesktop.org/wiki/, Jan. 8, 2019, 2 Pages.

Nvidia, "CUDA multi process service overview", Retrieved From: https://docs.nvidia.com/deploy/pdf/CUDA_Multi_Process_Service_Overview.pdf, Oct. 2018, 28 Pages.

Nvidia, "GeForce GTX TITAN Black", Retrieved From: https://www.nvidia.com/content/geforce-gtx/GTX_TITAN_X_User_Guide.pdf, 2018, 17 Pages.

Owusu, "Oasis: on achieving a sanctuary for integrity and secrecy on untrusted platforms", In ACM Conference on Computer and Communications Security, 2013, 12 Pages.

Park, et al. "Chimera: Collaborative preemption for multitasking on a shared", In International Conference on Architectural Support for Programming Languages and Operating Systems, Mar. 2015., 14 Pages.

Park, et al., "Dynamic resource management for efficient utilization of multitasking", In International Conference on Architectural Support for Programming Languages and Operating Systems., Apr. 2017, 14 Pages.

Pichai, et al., "Architectural support for address translation on gpus: Designing memory management units for cpu/gpus with unified address spaces.", In International Conference on Architectural Support for Programming Languages and Operating Systems, 2014, 15 Pages.

Pietro, et al., "Cuda leaks: A detailed hack for cuda and a (partial) fix.", Published in: Journal of ACM Transactions on Embedded Computing Systems (TECS), vol. 15 Issue 1, Article No. 15, Feb. 2016, 25 Pages.

Putnam, et al., "A Reconfigurable Fabric for Accelerating Large-Scale Datacenter Services", in Proceedings of the 41st Annual International Symposium on Computer Architecture (ISCA), Jun. 2014, 12 Pages.

Shinde, et al., "Panoply: Low-TCB Linux Applications with SGX Enclaves", In Proceedings of 24th Annual Network and Distributed System Security Symposium, Feb. 1, 2017, pp. 1-15.

Shinde, et al., "Preventing Page Faults from Telling Your Secrets", In Proceedings of the 11th ACM on Asia Conference on Computer and Communications Security, May 30, 2016, pp. 317-328.

Ta-Min, et al., "Splitting interfaces: Making trust between applications and operating systems configurable", In Department of Electrical and Computer Engineering University of Toronto., 2006, 14 Pages.

Tanasic, et al., "Enabling preemptive multiprogramming on GPUs.", In International Symposium on Computer Architecture, 2014, 12 Pages.

Tomov, et al., "MAGMA: Development of high-performance linear algebra for GPUs.", In GPU Technology Conference, Mar. 2014, 45 Pages.

(56) References Cited

OTHER PUBLICATIONS

Vasiliadis, "PixelVault: Using GPUs for securing cryptographic operations.", In Proceedings of the 2014 ACM SIGSAC Conference on Computer and Communications Security., Nov. 2014, 12 Pages.

Wang, et al., "Simultaneous multikernel GPU: Multi-tasking throughput processors via fine-grained sharing", In International Conference on High-Performance Computer Architecture, Feb. 2016., Mar. 2016, 12 Pages.

Weiser, et al., Sgxio: Generic trusted i/o path for intel SGX In Proceedings of the Seventh ACM on Conference on Data and Application Security and Privacy., Mar. 2017, 12 Pages.

Xu, et al. "Controlled—Channel Attacks: Deterministic Side Channels for Untrusted Operating Systems", In 2015 IEEE Symposium on Security and Privacy, SP 2015, May 17, 2015, 17 Pages.

Yu, et al., "Trusted display on untrusted commodity platforms", In ACM Conference on Computer and Communications Security, 2015, 15 Pages.

Zhu, et al., "Understanding the security of discrete GPUs" In Proceedings of the General Purpose GPUs, GPGPU-10, ACM, 2017, 11 Pages.

"Notice of Allowance Issued in U.S. Appl. No. 16/166,047", dated May 20, 2021, 10 Pages.

"Non Final Office Action Issued in U.S. Appl. No. 16/166,047", dated Jul. 21, 2020, 11 Pages.

"International Search Report and Written Opinion Issued in PCT Application No. PCT/US19/037597", dated Aug. 1, 2019, 13 Pages.

Jin, et al., "Secure MMU: Architectural Support for Memory Isolation Among Virtual Machines", In Proceedings of IEEE/ IFIP 41st International Conference on Dependable Systems and Networks Workshops, Jun. 27, 2011, pp. 217-222.

Maene, et al., "Hardware-Based Trusted Computing Architectures for Isolation and Attestation", In Proceedings of the IEEE Transactions on Computers, vol. 67, Issue 3, Jan. 8, 2017, 14 Pages.

"International Search Report and Written Opinion Issued in PCT Application No. PCT/US19/049614", dated Nov. 15, 2019, 10 Pages.

\* cited by examiner

| | OWNER | STATE | LOCK | | | |
|---|---|---|---|---|---|---|
| RESOURCE 1 | | | | | | |
| RESOURCE 2 | | | | | | |
| RESOURCE 3 | | | | | | |
| ... | | | | | | |

FIG. 4

PERIPHERAL DEVICE WITH RESOURCE ISOLATION

BACKGROUND

Peripheral devices such as graphics processing units, field-programmable gate arrays (FPGAs), application-specific integrated circuits, cryptographic accelerators, video processing units, regular expression accelerators, data compression accelerators, artificial intelligence accelerators and others are increasingly widely used to complement a central processing unit (CPU). Peripheral devices which comprise computer hardware to perform functions more efficiently than is possible in software running on a general-purpose CPU are often very useful units, separate from the CPU which act as hardware accelerators. Typically these types of peripheral device improve the execution of specific types of algorithm by allowing greater concurrency.

Increasingly there is a desire to work with sensitive code and or sensitive data and to retain security and privacy. Often large amounts of sensitive code and or data are to be processed using resource intensive algorithms and peripheral devices are an option to improve efficiency in such situations. However, where peripheral devices are used additional challenges are introduced regarding security and privacy of sensitive code and/or data since there is both a host and a peripheral device which can potentially be attacked by a malicious party.

The embodiments described below are not limited to implementations which solve any or all of the disadvantages of known peripheral devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a peripheral device package for use in a host computing device. The peripheral device package has a plurality of compute elements and a plurality of resources shared by the plurality of compute elements. A datastructure is stored in a hidden memory of the peripheral device package. The data structure holds metadata about ownership of resources of the peripheral device package by a plurality of user runtime processes of the host computing device which use the compute elements. At least one of the user runtime processes is a secure user runtime process. The peripheral device package has a command processor configured to use the datastructure to enforce isolation of the resources used by the secure user runtime process.

In various examples there is a computer-implemented secure user runtime process having instructions for execution on a peripheral device package of an untrusted host computing device. The secure user runtime process comprises sending commands via the untrusted host to a command processor of the peripheral device package, the commands using a datastructure in a hidden memory of the peripheral device package to enforce isolation of resources of the peripheral device package used by the secure user runtime process.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 is a schematic diagram of a datastructure referred to as a protected resource metadata table;

Like reference numerals are used to designate like parts in the accompanying drawings.

DETAILED DESCRIPTION

Figure 1:
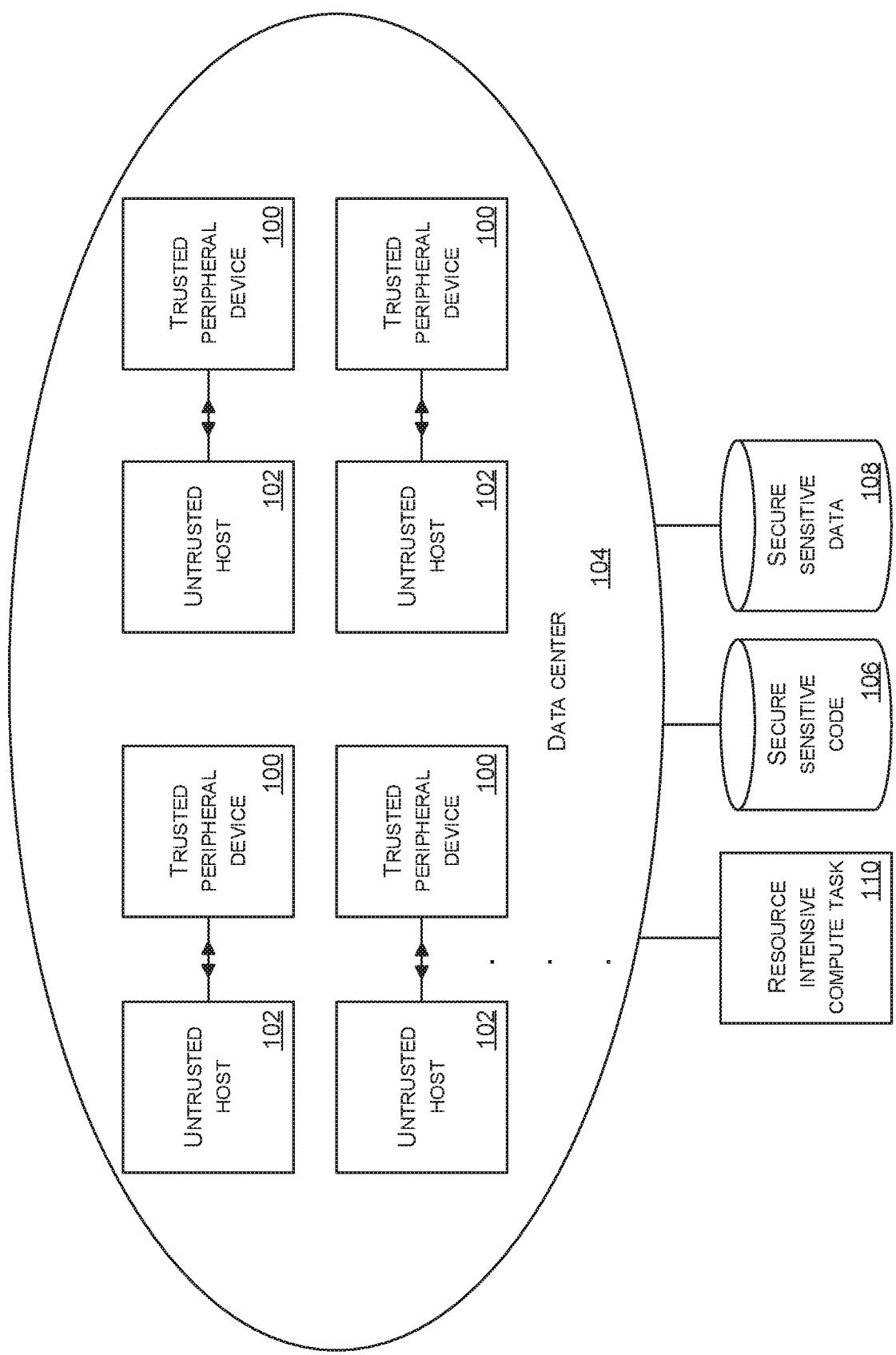
FIG. 1 is a schematic diagram of a data center comprising untrusted host computing devices with trusted peripheral devices.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In various examples described herein, a peripheral device package is used together with a host computing device. The host computing device is not trusted and is potentially malicious. The host computing device has a plurality of user runtime processes which use resources of the peripheral device package such as compute elements, buses, memory pages or other resources in order to more efficiency compute tasks such as image processing tasks, cryptographic tasks, or other types of resource intensive computations. In order to efficiently use the resources of the peripheral device package the host device has some control over which resources are used by which user runtime processes. However, this leads to potential security breaches in the case that the host device is not trusted, since the host device is able to reallocate or destroy resources of the peripheral device which support sensitive code and/or data.

One way to give security to a secure user runtime process which uses the peripheral device is to statically partition the resources between the secure user runtime process and other user runtime processes on the host. However, this leads to under-utilization of the resources on the peripheral device since the partitioning is static and cannot be changed dynamically according to particular needs at particular times. With static partitioning there is no sharing of resources between user runtime processes.

In at least some of the embodiments described herein isolation of resources used by secure user runtime processes is given whilst al lowing dynamic partitioning of the resources. This approach is found to give significant benefits in terms of increased utilization of resources on the peripheral device, whilst at the same time giving security of sensitive code and/or data of a secure user runtime process that exploits the peripheral device.

A device driver in a host computing device is able to carry out dynamic allocation of resources of the peripheral device. The device driver makes resource allocation decisions across the entire pool of resources. However, dynamic resource allocation requests made by the device driver to the peripheral device are vetted by a command processor at the peripheral device. Only where the requests meet particular requirements does the command processor implement the resource partitioning requests. The particular requirements are checked by checking a datastructure stored in a hidden memory at the peripheral device. The hidden memory is a memory which is not visible to the host computing device. The datastructure holds ownership data about which user runtime processes own which resources of the peripheral device at a current time. By making the checks on the datastructure and only implementing resource partitioning requests which pass the checks, it is possible to enforce resource isolation for user runtime processes which are to be executed securely on the peripheral device. A user runtime process receives responses from the peripheral device and is able to authenticate the responses. In this way a secure user runtime process at a host computing device is able to make use of resources on a trusted peripheral device, even where the host is untrusted and is potentially malicious.

FIG. 1 is a schematic diagram of a data center 104 comprising a plurality of untrusted host computing devices 102. Individual ones of the untrusted host computing devices 102 are connected to trusted peripheral devices 100. The untrusted host computing devices 102 are interconnected using communications links which are not shown in FIG. 1 for clarity and the resulting network may include one or more computing devices which have no peripheral devices. Suppose the data center 104 is used to execute a resource intensive compute task 110 using sensitive code 106 and sensitive data 108. The data center is able to distribute the resource intensive compute task amongst various user runtime processes at the untrusted hosts 102. The trusted peripheral devices 100 are able to execute computations, in efficient ways making use of parallelization, and to do this in a way which is secure even though the hosts 102 are untrusted and even though other unsecure processes are executing in the data center at the same time. In a few years it is expected that a majority of compute cycles in public clouds will be contributed by peripheral devices such as accelerators.

FIG. 1 illustrates the situation for a data center. However, it is also possible to use an untrusted host 102 and trusted peripheral device 100 in stand-alone situations or in other types of deployment.

Figure 2:
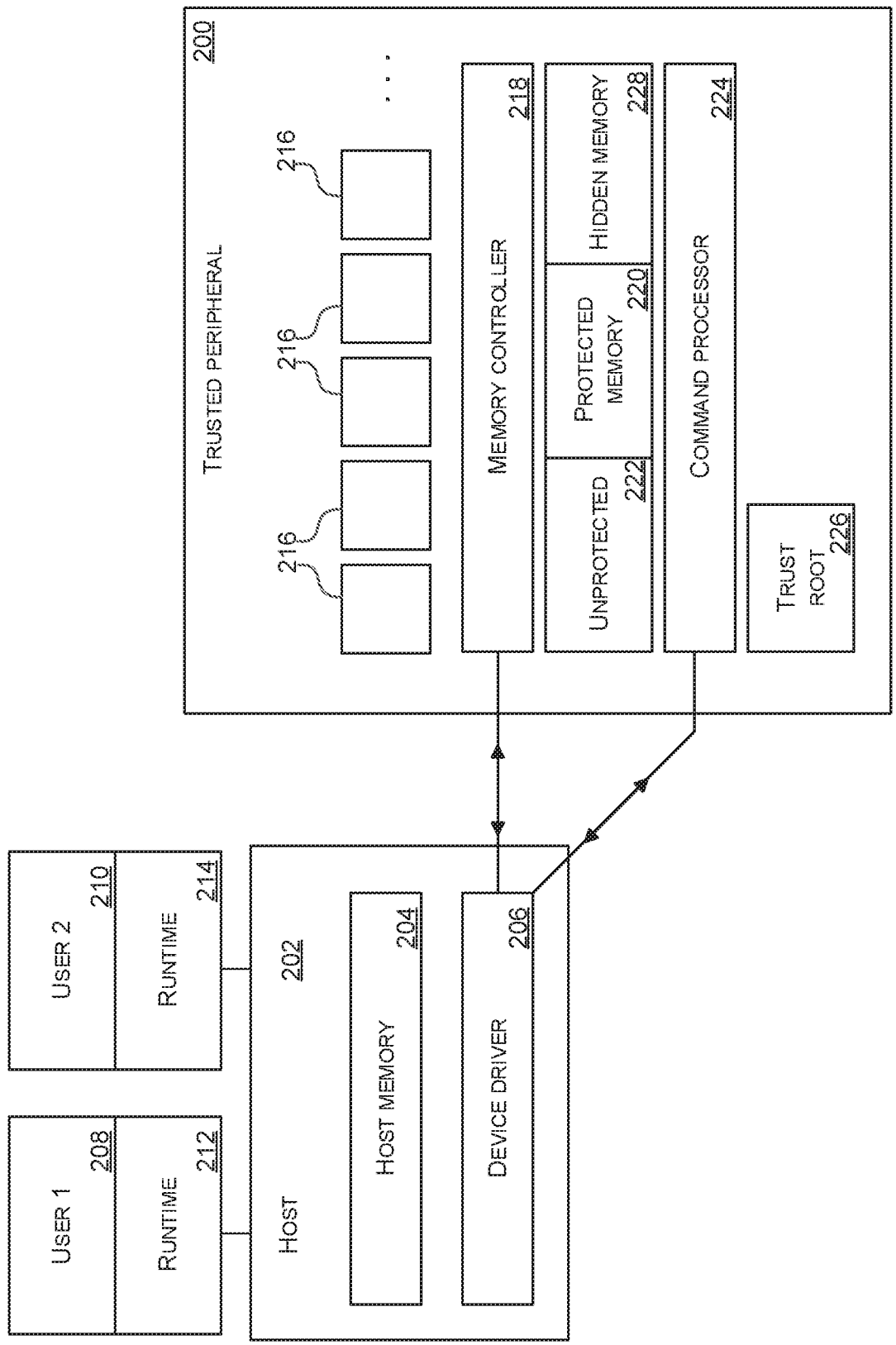
FIG. 2 is a schematic diagram of an untrusted host computing device, a trusted peripheral device and two trusted user applications and user runtime processes.

FIG. 2 is a schematic diagram of a host computing device 202 comprising host memory 204 and a device driver 206. The host computing device 202 comprises other components of a conventional computer such as a central processing unit (CPU) and other components not shown in FIG. 2 for clarity. Two applications indicated as user 1, 208 and user 2, 210 are software installed on the host computing device 202. The application 1 has associated user runtime process 212 and application 2 has associated user runtime process 214. In practice there are two or more applications each with an associated user runtime process and this example is simplified to the case of two applications for clarity.

In some examples the host computing device 202 has a trusted execution environment (TEE) which comprises trusted hardware in the CPU of the host computing device 202. The TEE is used to protect sensitive code and data from system administrators and from attackers who may exploit kernel vulnerabilities and control the entire software stack including the operating system and any hypervisor. Existing TEEs are restricted to CPUs and cannot be used in applications that offload computation to peripheral devices. This limitation gives rise to an undesirable trade-off between security and performance.

The present technology seeks to add trusted execution environment support to the peripheral device 200. FIG. 2 shows a trusted peripheral 200 connected to the host 202. The peripheral is referred to as a peripheral device package in some cases to indicate that the components of the peripheral are supported on silicon interposing layers as described in more detail with reference to FIG. 3 below. The peripheral comprises a plurality of resources such as compute elements 216, memory pages, a peripheral component interconnect (PCI) bus, and other resources. The resources are things which are to be used by one or more of the user runtime processes.

The peripheral 200 has a memory which is shared by the compute elements 216. The memory comprises a hidden memory 228 and optionally a protected memory 220 and optionally an unprotected memory 222. The hidden memory is memory which is not visible to the host 202. The protected memory 220 is memory which is visible to the host but not accessible to the host 202. The unprotected memory 222 is visible and accessible to the host 202.

The peripheral optionally has a memory controller 218 for controlling use of the shared memory 218 and has a command processor 224 which receives commands from the host 202 and schedules the commands onto the compute elements 216.

The peripheral has a trust root 226 which is a cryptographic key (referred to as an endorsement key) integrated into the hardware of the peripheral during manufacture, together with a cryptographic engine for asymmetric key generation and signing.

As shown in FIG. 2 the device driver is connected to the command processor 224 of the peripheral 200 via a communications link. There is also a communications link between the device driver 206 and the memory controller 218.

The device driver in the host manages device resources of the peripheral device such as memory of the peripheral device and in previous solutions has had visibility into the peripheral device. As a result it is challenging to design a trusted execution environment in the peripheral device while the host operating system is entrusted. Furthermore, high-throughput peripheral devices achieve high performance by integrating a large number of compute elements, and using high bandwidth memory to satisfy their massive bandwidth requirements. Any major change in the compute elements or in the memory subsystem results in unacceptably large overheads. For instance, enforcing memory isolation through checks during address translation would severely under-utilize accelerators due to their sensitivity to address translation latency. Similarly, providing memory integrity and confidentiality via an encryption engine would significantly increase memory bandwidth usage.

As shown in FIG. 2 the peripheral device 200 is for use with a host computing device 202. The peripheral device 200 comprises a plurality of compute elements 216 and a plurality of resources shared by the plurality of compute elements. For example, the resources are pages of the shared memory, individual ones of the compute elements, and peripheral component interconnect resources. A datastructure (not shown in FIG. 2) is stored in a hidden memory 228 of the peripheral device 200, the data structure holding metadata about ownership of resources of the peripheral device 200 by a plurality of user runtime processes 212, 214 of the host computing device 202 which use the compute elements 216, at least one of the user runtime processes 212, 214 being a secure user runtime process. A command processor 224 is configured to use the datastructure to enforce isolation of the resources used by the secure user runtime process. In this way dynamic allocation of resources of the peripheral device is possible by sending commands from the user runtime process to the command processor. However, the command processor is able to enforce isolation of the appropriate ones of the resources to give security where desired by using the datastructure to make checks.

In various examples, a TEE on the peripheral device package takes the form of a secure context, comprising a collection of peripheral device resources (memory, command queues, registers, etc) that are cryptographically bound to a public/private key pair and isolated from untrusted software on the host (including the driver) and all other peripheral device contexts. Once a secure context has been created, its resources can only be accessed by a user application/runtime in possession of the corresponding private key. As long as the key is protected from an adversary (e.g. hosted in a CPU TEE), the adversary cannot access the context's address space. Two additional primitives are supported, measurement for generating remotely verifiable summaries of a context's state and the platform, and secure memory allocation and deallocation for letting a device driver dynamically allocate and free device memory without compromising security.

Strong security is obtained by redefining the interface between the device driver in the host and the hardware of the peripheral device. The driver is prevented from directly accessing security sensitive resources such as page directories, page tables and other pages containing sensitive code and data. Instead, the driver routes resource allocation requests through the peripheral device's command processor. The command processor tracks ownership of resources using a datastructure in its hidden memory, and ensures that no resource owned by a victim context can be accessed by the adversary. The command processor also ensures that the resources are correctly initialized on allocation to a secure context, and cleaned up on destruction, preventing attacks which exploit improper initialization.

The peripheral device has low hardware complexity, low performance overheads and crypto-agility. There are no changes to the peripheral device compute elements or the peripheral device memory subsystem and most changes are restricted to peripheral components, such as the peripheral device command processor. No restrictions are placed on the instruction set available within the TEE of the peripheral device. A CUDA (trade mark) runtime can use the primitives described herein to build secure versions of higher-level APIs such as memory copy, kernel launch, and (AIDA streams which in turn can be used to build applications with end-to-end confidentiality and integrity.

A secure user runtime process (such as 212 in FIG. 2) has instructions for execution on the peripheral device 200 of an untrusted host computing device 202, the secure user runtime process 212 comprising:

sending commands via the untrusted host 202 to a command processor 224 of the peripheral device 200, the commands using a datastructure in a hidden memory 228 of the peripheral device 200 to enforce isolation of resources of the peripheral device 200 used by the secure user runtime process 212. In this way the user runtime process is able to operate on an untrusted host and still have isolation of resources it uses on the peripheral device.

Figure 3:
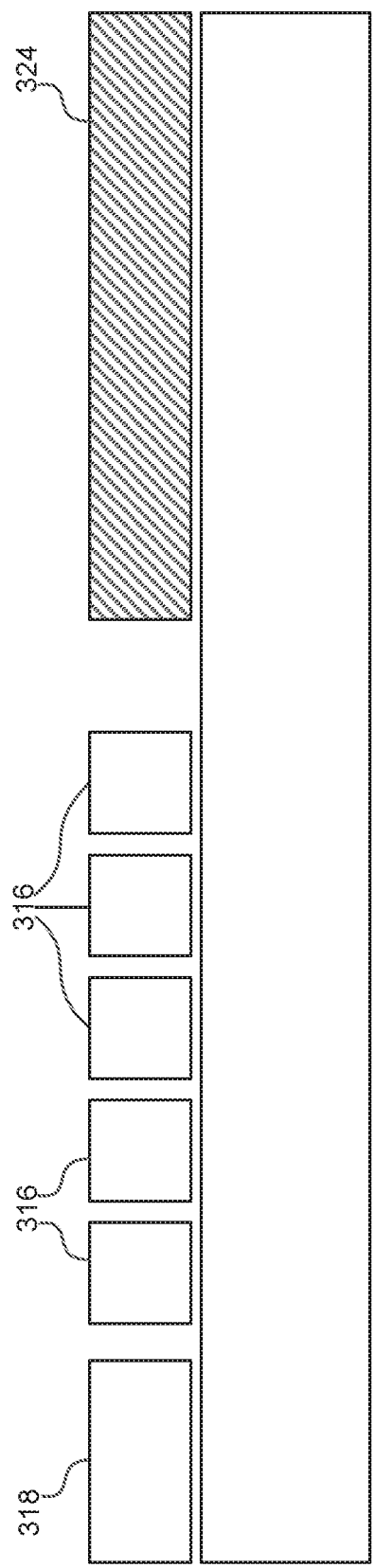
FIG. 3 is a schematic cross section through a peripheral device package.

FIG. 3 is a schematic diagram of the peripheral of FIG. 2 showing silicon interposing layers supporting a plurality of compute elements 316, supporting the memory controller 318 and supporting the shared memory 324. The peripheral device is a package in this case since it is formed on silicon. The trust root 226 is not visible in FIG. 3 but is burned into the device's e-fuses during manufacturing in some examples or integrated into the hardware of the device package in any permanent manner. The trust root 226, together with a certification authority in communication with the host computing device over a communications network, enable remote attestation for establishing trust between a secure context and a remote challenger. A context comprises a plurality of channels on the peripheral computing device, where a channel is a plurality of resources on the peripheral computing device which are allocated to a particular user runtime process. More detail about channels is given later in this document. A secure context comprises one or more secure channels on the peripheral device package which are used by a secure user runtime process. A secure channel comprises one or more resources such as page tables, compute elements which are used by the secure user runtime process and which are isolated from other resources on the peripheral device package.

When the peripheral device package is initialized, it generates a fresh attestation key pair (comprising a public key and a private key) and stores the private key securely in secure random access memory (SRAM) within the command processor. The peripheral device package signs the public part of the attestation key with the endorsement key and makes the signed public part of the attestation key available to the device driver 206 in the host 202. The host 202 sends the signed public part of the attestation key to the certification authority. The certification authority validates the signature using a repository of private endorsement keys provisioned by the manufacturer of the peripheral device package and generates a signed attestation key certificate. The certificate is sent to the device driver 206 and stored. The certificate is used by the device driver 206 during secure context creation to prove to a challenger that the peripheral device package holds and protects the private part of the attestation key.

Figure 4:
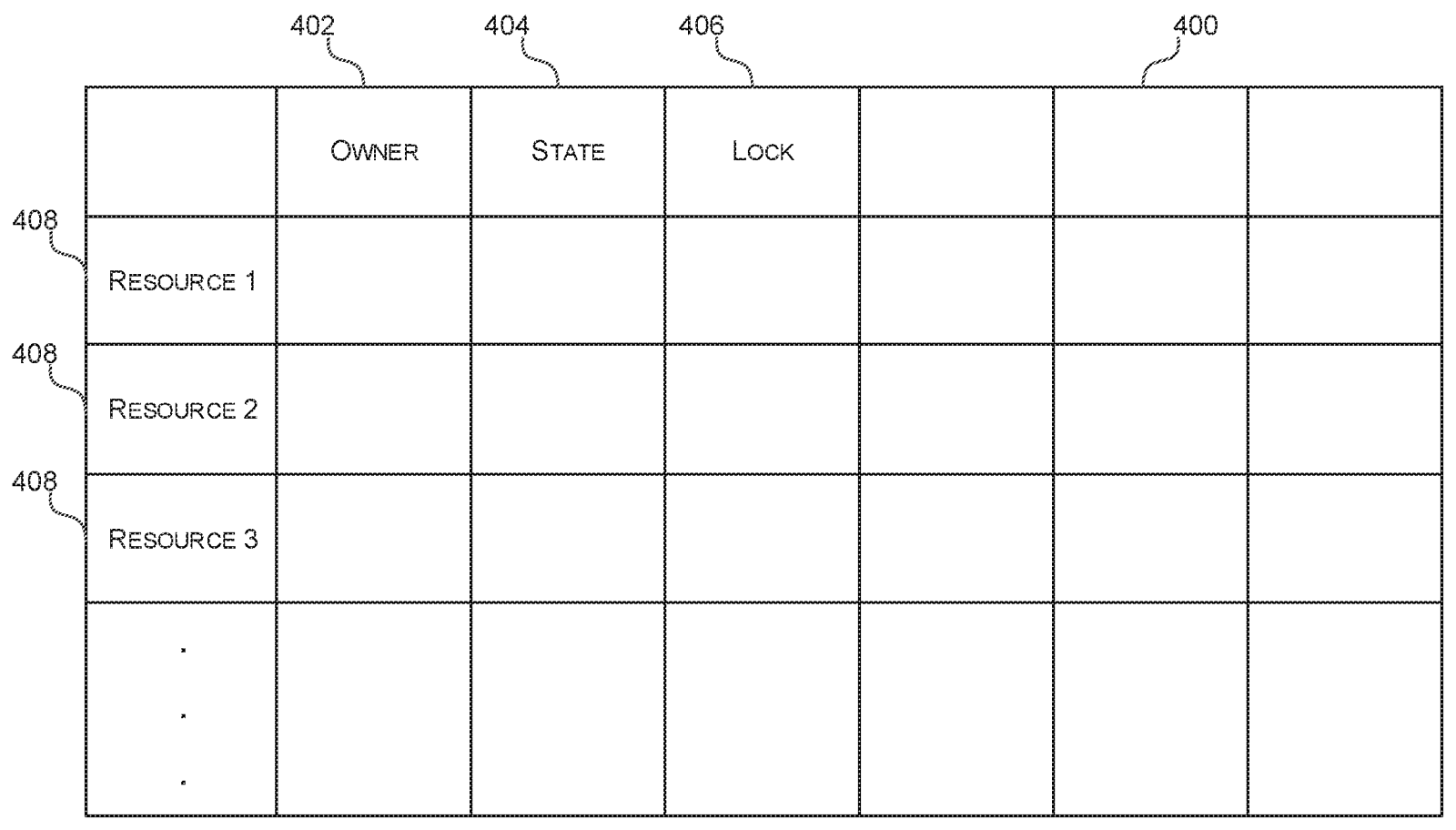
Figure 5:
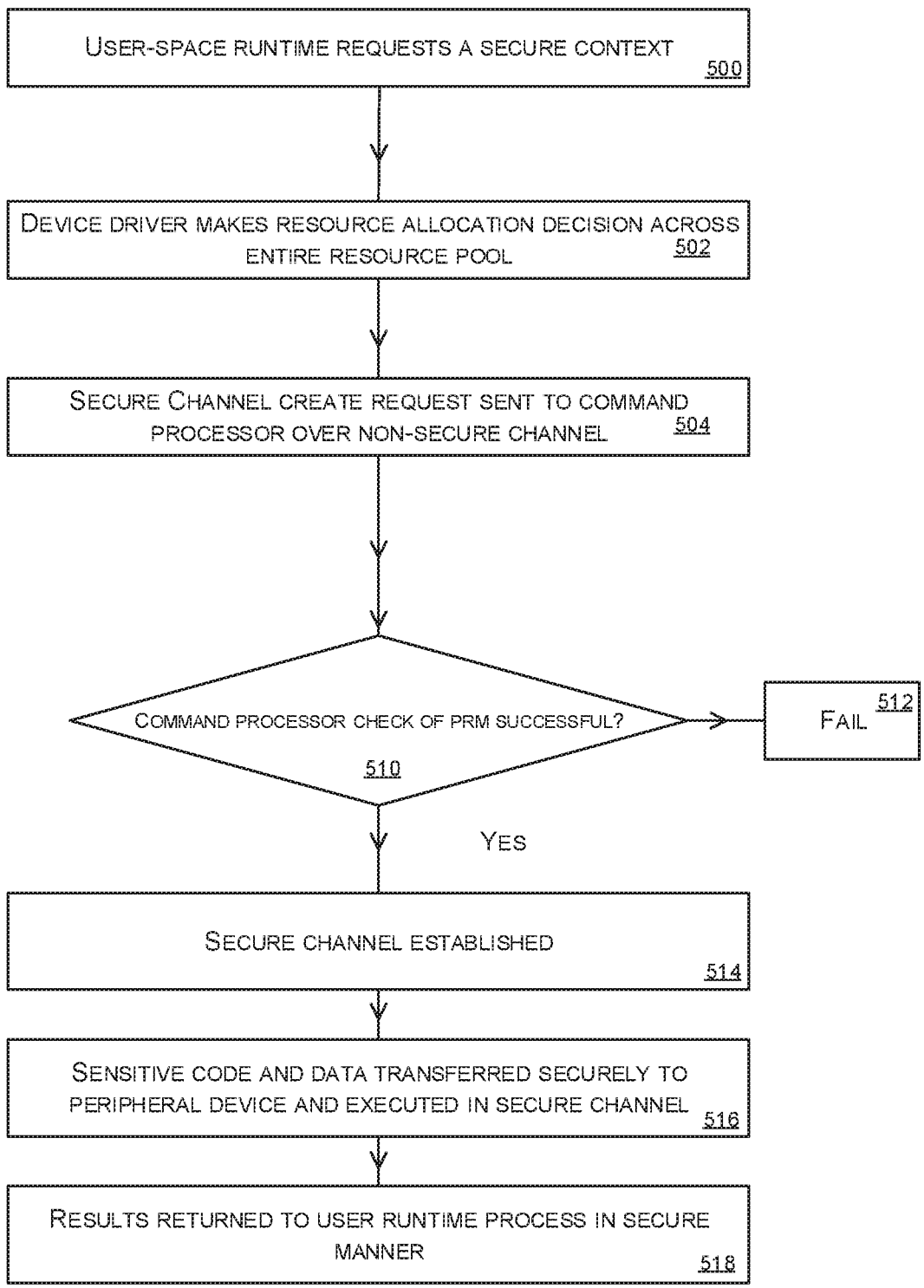
FIG. 5 is a flow diagram of a method of operation at a user runtime process

Within the hidden memory of the peripheral is an example of a datastructure 400 as illustrated schematically in FIG. 4. The datastructure 400 is illustrated as a table but can be in other formats such as an array or list which give the same function as a table. The datastructure is referred to as a peripheral resource metadata table (PRM) in some examples. The datastructure stores ownership data of resources of the peripheral device. In the example of FIG. 4 there is one row 408 for each resource of the peripheral. Column 402 stores a number which identifies a user process which owns the resource at the present time. Owning in this context means that the user process has been assigned an ability to use the resource. Column 404 stores a binary digit which indicates whether the resource is owned or not. Column 406 stores a binary digit which indicates whether the resource is locked or not. A locked resource is one which can only be unmapped with user runtime process authorization. An unlocked resource has potential to be used by different user runtime processes and can be unmapped without user runtime process authorization. Additional columns of the datastructure store information about any other characteristics of the resources which are tracked by the peripheral. The PRM illustrated in FIG. 4 is an example only and other forms of PRM are possible. Another example of a PRM is given later in this document, FIG. 5 is a flow diagram of a method of operation in the case of an entrusted host and a trusted peripheral device. A user runtime process requests 500 a secure context. The device driver receives the request and it makes 502 a resource allocation decision for allocating device memory required by context management, such as page directory and tables. The device driver then sends 504 a secure channel create command to a command processor of the peripheral device. The secure channel create command is sent over a non-secure channel to the command processor and the command includes a public key provisioned by the user runtime process. More detail about the secure channel creation protocol and how the public key is used is explained later in this document. The command processor proceeds to check the PRM to see if the resource allocation decision of the device driver is appropriate for a secure channel. If the PRM checks fail the process fails 512. If the PRM checks succeed the secure channel is established 514.

Resources on the peripheral are allocated after context creation, either explicitly for data or implicitly for code. The user runtime process follows a protocol which is described later in this document to securely transfer 516 sensitive code and data to the peripheral device. The sensitive code and sensitive data are executed in the secure channel on the peripheral device.

Results of the execution on the secure channel are returned to the user runtime process in a secure manner 518.

Thus the command processor receives resource management commands from the user runtime processes via a driver of the peripheral device package, the driver being in the host computing device. The command processor receives the commands after specification of resources in the commands made by the driver (that is the driver makes resource allocation decisions across the entire resource pool and specifies the result of the resource allocation in the commands). The command processor is configured to return responses to the received commands for authentication by the user runtime process such as by sending signed digests.

Note that a non-secure channel is used to send commands for channel and resource management to the command processor, and to return responses from the command processor to the user runtime process. Some but not all of the commands sent over the non-secure channel contain signed digests from the user runtime process (keyed MAC) as part of the command. Some but not all of the responses returned by the command processor over the non-secure channel contain signed digests (keyed MAC) by the command processor as part of the response. The signed digests enable the communications over the non-secure channel to be checked.

The command processor on the peripheral device package is extended with commands for creation, management and destruction of secure channels on the peripheral device package and these commands are part of an application programming interface (API) of the command processor. The commands for creation, management and destruction of secure channels use the PRM datastructure in hidden memory on the peripheral device as now explained with reference to FIGS. 6 to 11 in order to enforce resource isolation of secure channels. When the user runtime process wants to securely offload and execute sensitive code and data on the peripheral device package it is able to create suitable secure channels and then follow a protocol for secure memory copy and kernel launch which is described later in this document.

The API of the command processor is extended to include the following commands in at least some examples of the technology. The commands are described in detail later in this document.

| Command | Attributes | Description |
| --- | --- | --- |
| CH_CREATE | chid, pgd_address, public_key - quote | Sets page directory address within channel descriptor. Returns quote for secure channels |
| CH_DESTROY | chid, MAC | Unsets channel descriptor and page directory Expects a keyed MAC of command for secure channels |
| CH_PDE | chid, pgd_index, PDE | Sets page table address in a page directory entry |
| CH_PTE | chid, pgd_index, pgt_index, size, PTE[ ] - summary, MAC | Sets mapping in page table entry Expects keyed MAC for user-authorized deallocation Returns a summary along with a MAC for secure allocations |
| CH_MEASURE | chid, address, size - measurement, MAC | Returns a measurement of a range of virtual addresses mapped in a secure channel along with a MAC |

A secure channel is created using the command CH_CRE-ATE (which is described in detail below) and specifying a public key UKpub and specifying a channel identifier (∈[1 . . . N]. N is the number of channels supported by the device. On receiving the request, the command processor generates a fresh symmetric key known as the channel encryption key (CEK), which is intended to be used for encrypting and signing commands posted to this channel. The CEK and UKpub for each channel are stored in a region of device memory accessible only to the command processor. CH_CREATE may be used to create multiple channels associated with the same secure context by passing the same UKpub, in which case all such channels will use the same CEK.

After generating the CEK, the command processor establishes a session by securely transferring the CEK to the user runtime process. The command processor encrypts the CEK with UKpub, generates a response comprising a quote containing the encrypted. CEK and a hash of UKpub. The quote also contains the channel identifier and all security critical platform-specific attributes, such as the firmware version, and is signed by the AK. The device driver passes the response comprising the quote and the AK certificate (obtained during initialization) to the user runtime process. The user runtime process authenticates the response by (i) verifying the AK certificate, (ii) verifying the quote using the public AK embedded in the certificate, and (iii) checking that the public key in the quote matches UKpub. The user runtime process can then decrypt the CEK and use it for encrypting and signing all commands sent to the GPU.

On its part, the command processor authenticates and decrypts all commands it receives over the secure channel using the CEK. This guarantees that only the user in possession of the CEK can execute tasks that access the context's address space. The protocol additionally uses nonces (derived in monotonically increasing order from an initially agreed seed) per channel to protect commands from message dropping, replay and re-ordering attacks. This ensures that commands generated by the GPU runtime are delivered to the command processor without tampering and in the right order.

Figure 6:
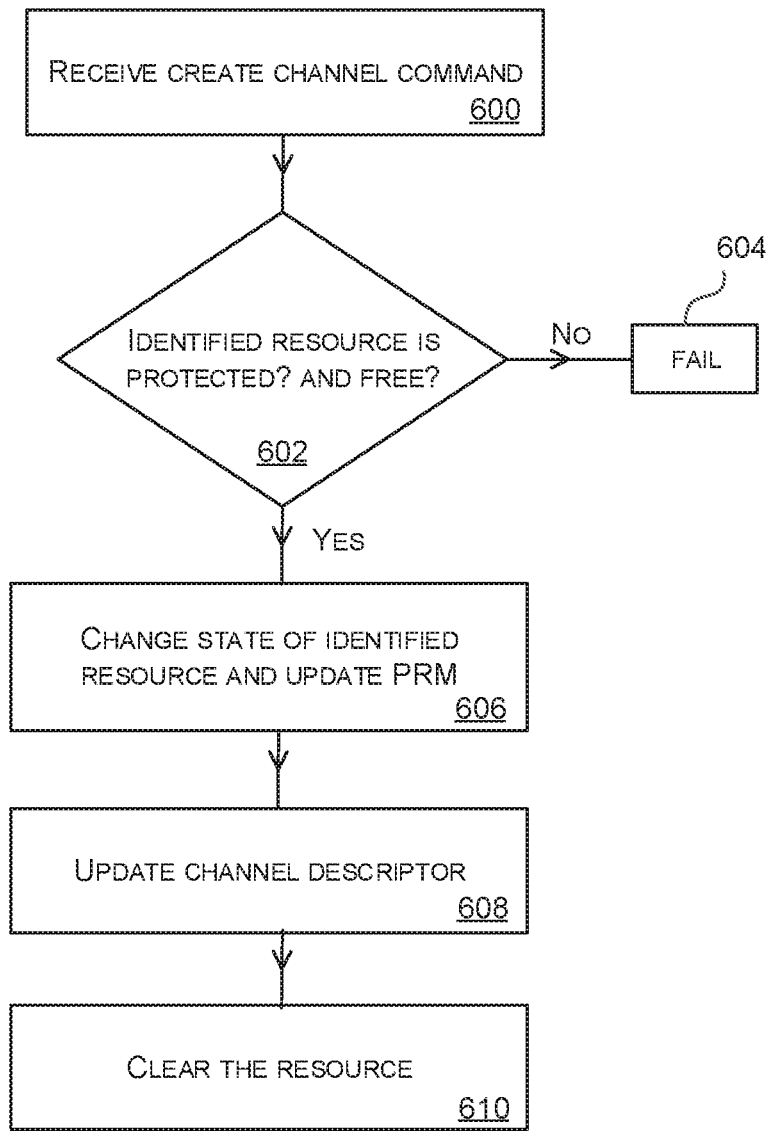
FIG. 6 is a flow diagram of a method of operation at a command processor according to a create channel command.

FIG. 6 is a flow diagram of a method CH_CREATE at the command processor for creating a secure channel. This command takes as a parameter an address of a page directory (pgd_address) for a newly created secure channel child. The command processor receives 600 a CH_CREATE command and it checks 602 (by looking in the datastructure in hidden memory) whether the page directory is allocated on pages in a protected region of the shared memory on the peripheral device package, and that the pages are in FREE state (where a FREE state indicates that the pages are not already used). The former constraint ensures that after channel creation, the driver does not bypass the command processor and read or write to the page directory directly over memory-mapped input-output registers (MMIO).

If the checks 602 succeed, the pages transition 606 to a MAPPED state (as opposed to being FREE), and an owner_id attribute of pages containing the page directory are updated to the identifier of the channel being created. If a secure channel is being created (using a public key), the pages transition to a LOCKED state. The command processor then updates 608 the address of the page directory in the channel descriptor, and clears 610 the contents of pages storing the page directory to prevent an attacker from injecting stale translations. CH_CREATE fails 604 if the channel descriptor or the page directory are already locked or mapped to an existing channel.

Figure 7:
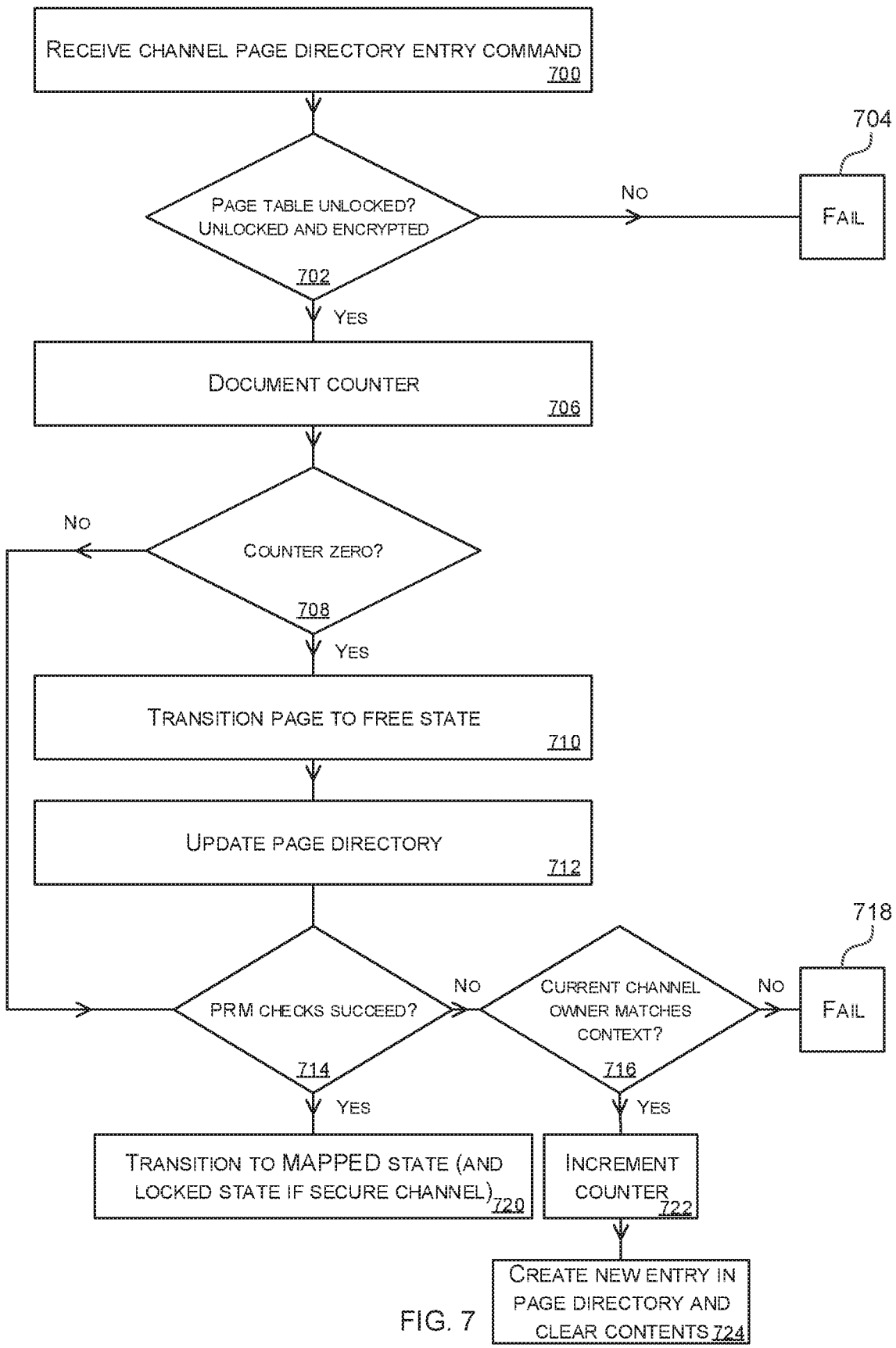
FIG. 7 is a flow diagram of a method of operation at a command processor according to a channel page directory entry command.

FIG. 7 is a flow diagram of a method at the command processor triggered by a channel page directory entry command of the command processor API. The command processor receives 700 a channel page directory entry command CH_PDE. This command unmaps an existing page table if one exists and maps a new page table at a specified index (pg_index) in the page directory of the channel chid. An entry in the page directory may refer to a small or big page table.

Before unmapping, the command checks 702 if the page table is in UNLOCKED state, or the page table is in the LOCKED state and pgt_entrycnt attribute is zero. In either case, the command processor decrements 706 a counter denoted ref cnt. If ref cnt reduces to zero 708, the page transitions 710 to FREE state. The entry is then cleared 712 in the page directory.

Before mapping a new page table, the command checks 714 (by checking the datastructure in hidden memory) whether the page table is allocated on pages in the protected region and in FREE state. If the checks succeed, the pages transition 720 to a MAPPED state. Additionally, if the channel is secure, the pages transition to a LOCKED state by setting the lock bit. However, if these pages are already MAPPED (no selected at check 714), the command checks 716 if the channel that owns the page (the current owner_id) and the channel that the page table is being mapped to belong to the same context by comparing the corresponding public key hashes. If the hashes match, the page's reference count is incremented 722. This allows physical page tables and hence physical pages to be shared between channels as long as they share the same context; this is required for supporting features such as CUDA (trade mark) streams. If either of the checks succeed, the command creates 724 a new entry in the page directory and clears the contents of the pages storing the page table. The command fails 718 if the page table is mapped to a channel associated with a different context.

Figure 8:
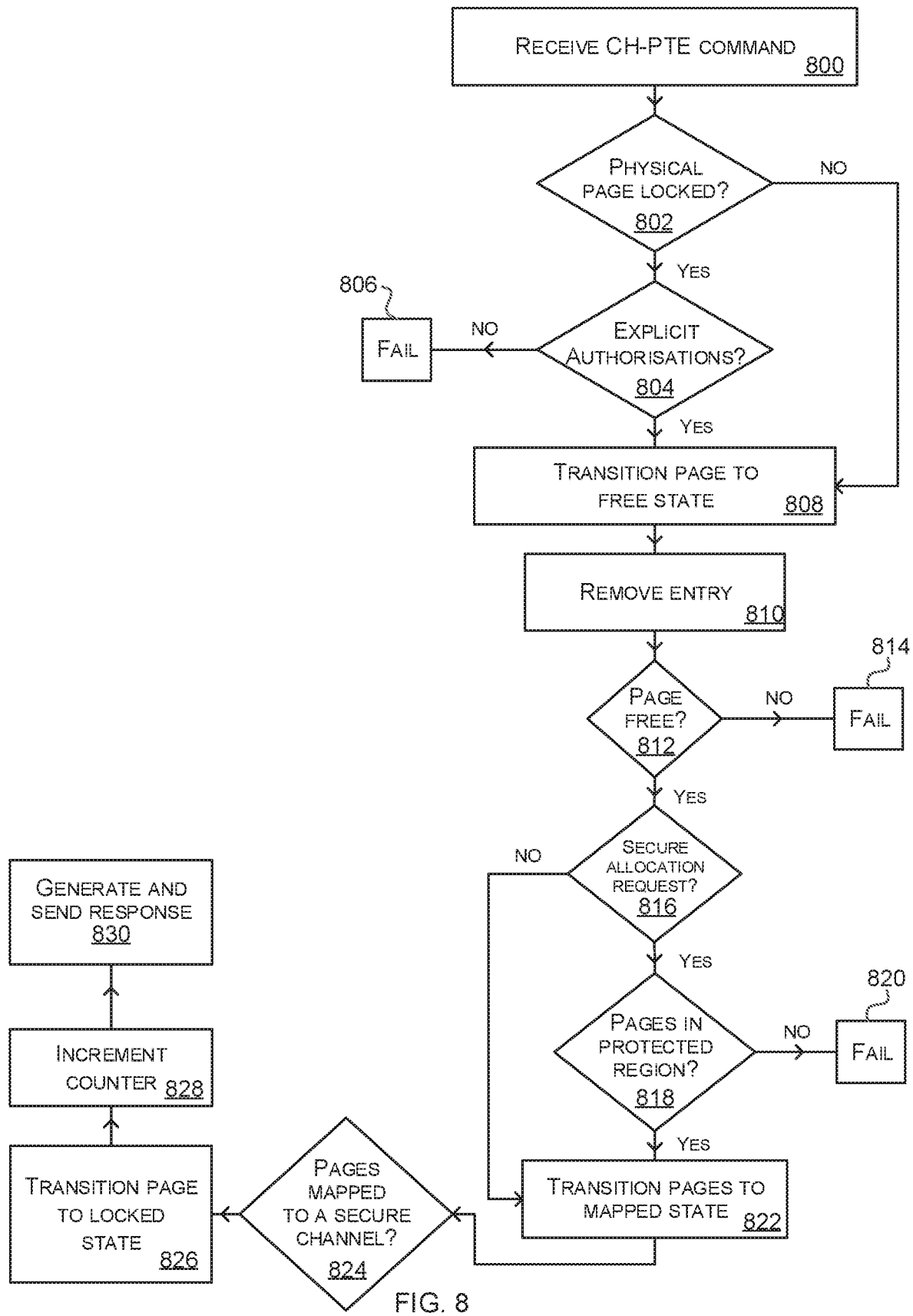
FIG. 8 is a flow diagram of a method of operation at a command processor according to a channel page table entry command.

FIG. 8 is a flow diagram of a method of operation at the command processor when it receives 800 a channel page table entry CH_PTE command. The CH_PTE removes any existing mappings from the page table and creates new mappings (specified by an array named page table entry (PTE)) starting from a given virtual address pgt_index) and spanning over a specified range (size). Each PTE entry may either refer to a small or big page (specified by a bit in the PTE).

Before removing an existing page table entry, the command checks 802 (by looking in the datastructure in hidden memory) if the physical page is in an UNLOCKED state. To remove mapping for a LOCKED page, the command requires explicit authorization 804 in the form of a message authentication code (MAC) over the command generated using a channel encryption key (CEK) of the secure session between the user runtime process and the command processor. This prevents a malicious driver from unmapping physical pages allocated to secure channels, and then remapping them to other channels. If the checks succeed, the page transitions 808 to FREE state, and the entry is removed 810. If the explicit authorization fails 804 the command fails 806.

Conversely, before creating new mappings, the command checks 812 if the pages are FREE. Additionally, if the request is a secure allocation request 816, the command checks 818 if the pages are located in the protected region (for sensitive code and data). Pages that are allocated on behalf of secure allocations are to be locked and included as a summary in the signed digest. Pages that are allocated on behalf of non-secure allocations do not need to be locked or included as a summary in the signed digest. If the checks succeed, the page transitions 822 to MAPPED state, and if the page is being mapped 824 to a secure channel, the pages transition 826 to LOCKED. Note that CH_PTE also permits pages in the unprotected region to be mapped to a secure channel; these pages can be accessed over MMIO and are used to store objects such as fence buffers required by the driver for synchronization. On success, the command increments 828 the pgt_entrycnt of the pages. The command fails 814 if any of the pages being mapped are already mapped.

A response is generated 830 only for secure allocations. The mappings are encoded compactly using the starting virtual address and the number of pages allocated in the protected region. The response also contains the channel identifier and a keyed MAC using the CEK of the channel. The response is sent 830 to the user runtime process via the device driver. In the case where an object spans multiple page tables, the driver collects the response from multiple CH_PTE commands. The driver returns this response back to the user runtime process. The user runtime process, which has access to the CEK, is able to detect if the response has been tampered with or replayed, and verify if the entire object has been allocated in the protected region, and in the right channel.

Figure 9:
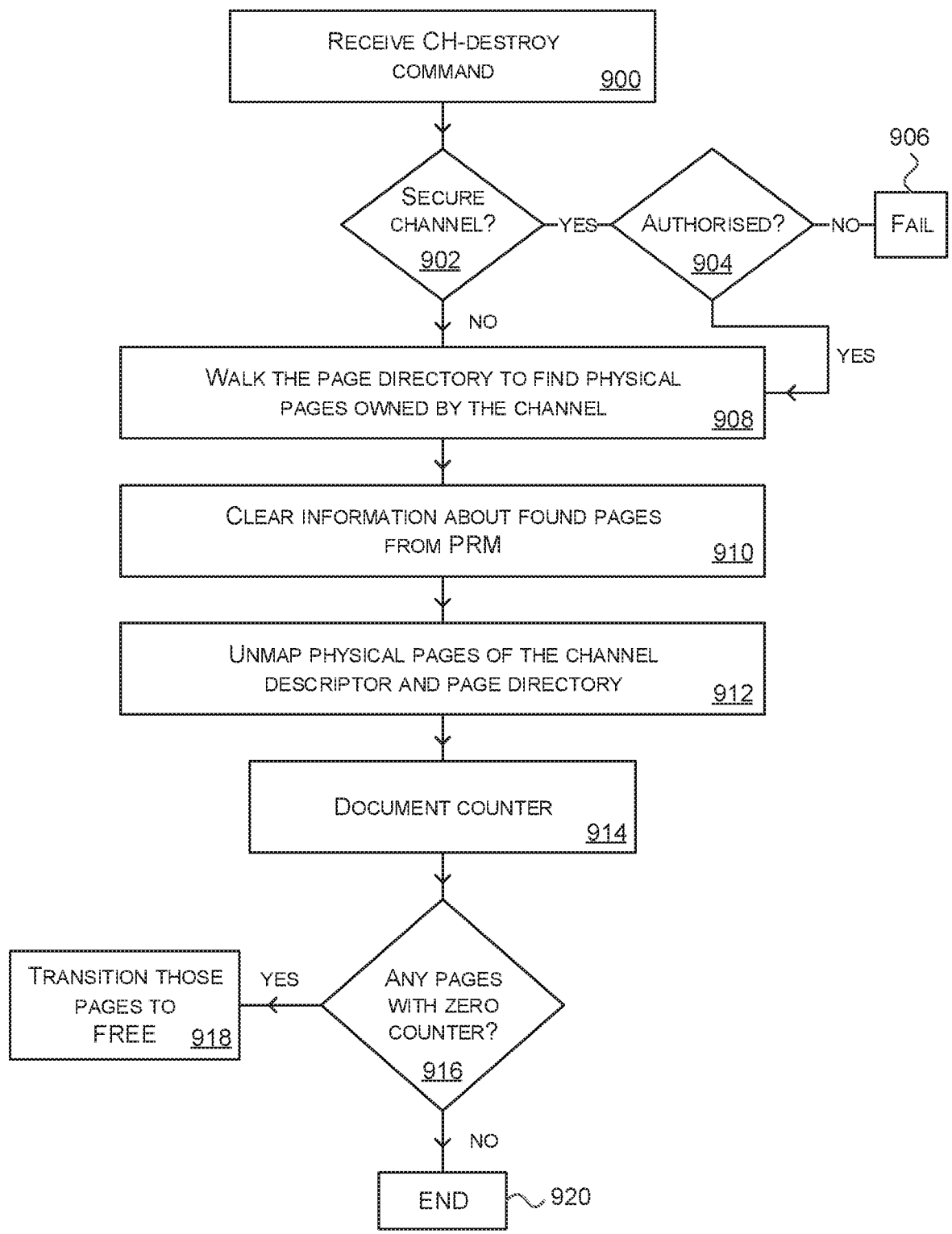
FIG. 9 is a flow diagram of a method of operation at a command processor according to a channel destroy command.
Figure 10:
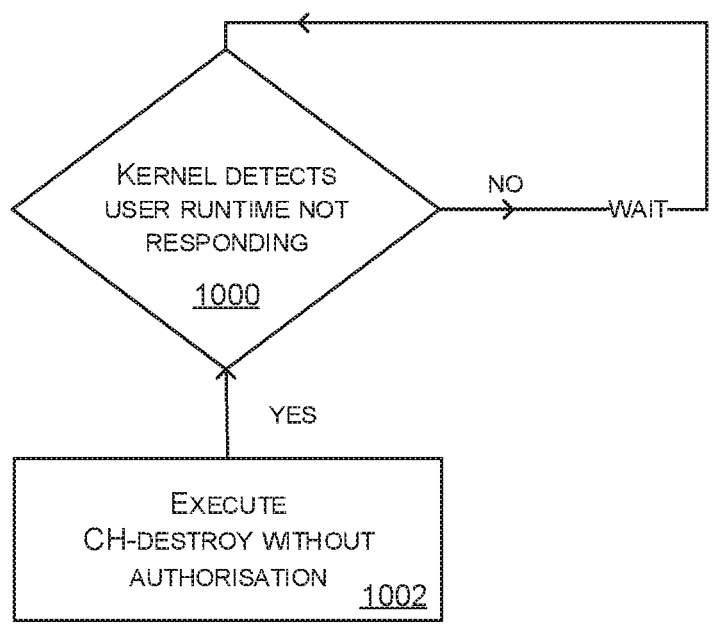
FIG. 10 is a flow diagram of a method of operation at a command processor when a user runtime process is detected as not responding.
Figure 11:
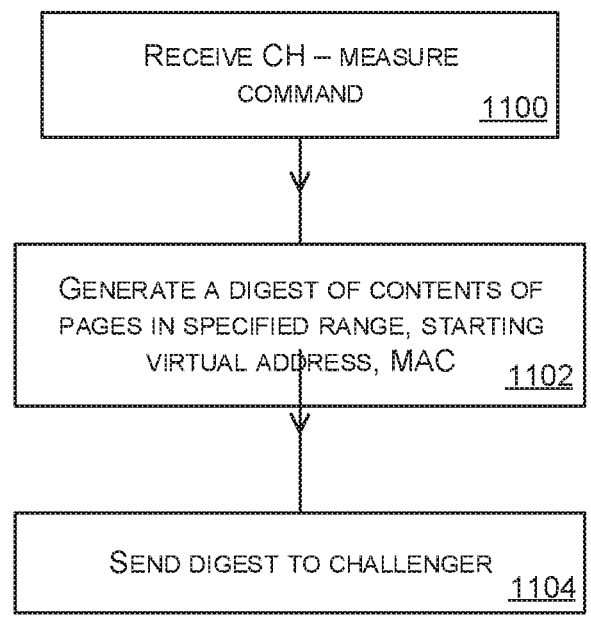
FIG. 11 is a flow diagram of a method of operation at a command processor according to a channel measure command.

When the command processor receives a CH_DESTROY command the process of FIG. 9 is used. This command frees memory allocated to a channel by walking 908 the page directory, finding physical pages owned by the channel and clearing 910 their information them from the datastructure in the hidden memory. It then unmaps 912 physical pages of the channel descriptor and the page directory, decrements 914 ref cnt for pages used for page tables, and transitions 918 to FREE pages whose re fcnt reduces to 0 (see check 916 in FIG. 9).

For secure channels 902, the command requires explicit authorization 904 in the form of a MAC over the command using the CEK otherwise the command fails 906. But there are situations where the user runtime is no longer responsive (as detected by the kernel 1000 of FIG. 10), and the channel's resources must be cleaned up. For such scenarios (not illustrated in FIG. 9), the driver issues CH_DESTROY without authorization 1002. In such a scenario, the command processor walks the channel's page directory and page tables to find physical pages mapped exclusively to the channel's address space and clears their contents to prevent information leakage.

The command processor is also extended with a command CH_MEASURE for generating a verifiable artifact that summarizes the contents of a secure channel. The artifact can be used to prove to a challenger that a channel exists in a certain state on peripheral device hardware that guarantees channel isolation. When the command processor receives 1100 a CH_MEASURE command it receives as parameters of the command a range of virtual pages that should be included in the measurement. The command processor generates 1102 a measurement, which contains a digest of the contents of pages in the range, a starting virtual address along with a MAC using the CEK. The digest is sent 1104 to the challenger which is able to check the digest is as the challenger expects. In some examples, a user runtime process uses measurement to verify that a kernel has been copied to the secure channel's address space without tampering.

In various examples which are now described in detail the peripheral device package is a graphics processing unit GPU. However, these examples are applicable to other types of peripheral device. A non-exhaustive list of examples of suitable peripheral device is: graphics processing units, field-programmable gate arrays (FPGAs), application-specific integrated circuits, cryptographic accelerators, video processing units, regular expression accelerators, data compression accelerators, artificial intelligence accelerators.

To aid understanding of the technology, the architecture of an example of a graphics processing unit, its software stack and an associated CUDA programming model are now described, focusing on parts of the architecture which are important with regard to security.

Figure 12:
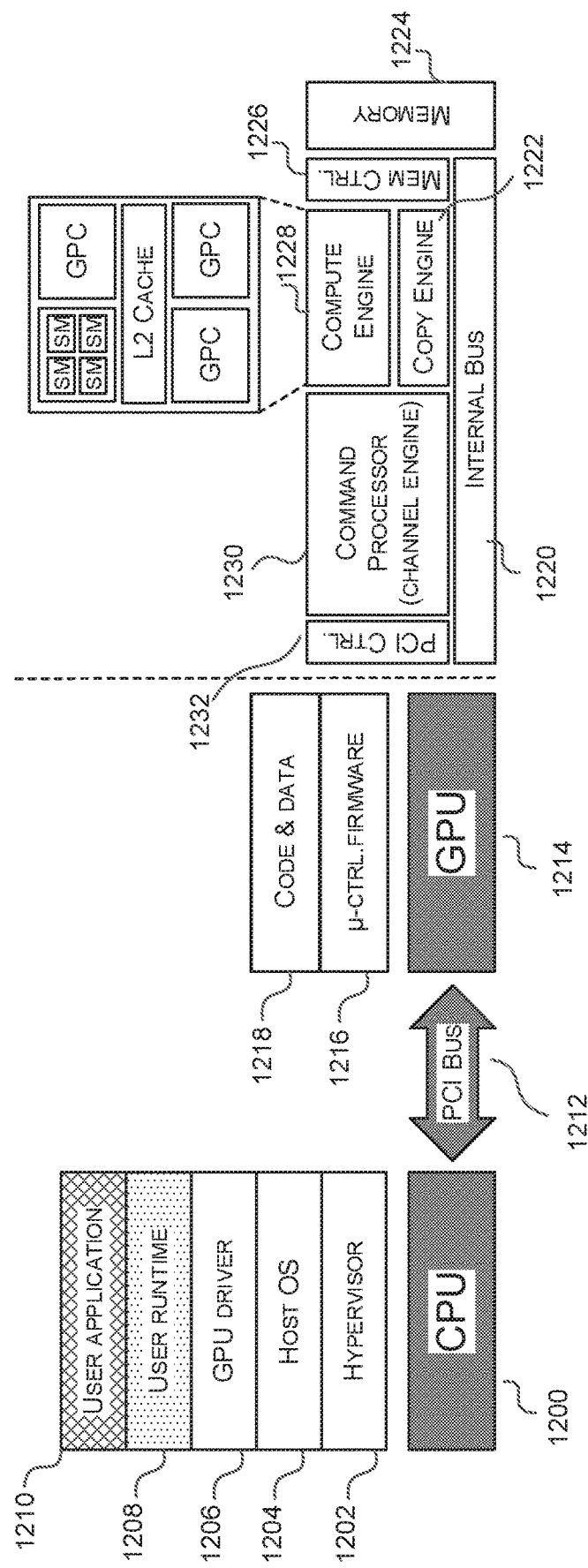
FIG. 12 is a schematic diagram of a central processing unit of a host computing device, a graphics processing unit connected to the host computing device, and showing software and hardware components.

FIG. 12 shows a CPU 1200 of a host computing device. The host computing device has a software stack comprising a hypervisor 1202, host operating system 1204, peripheral device driver (in this example a GPU driver 1206), a user runtime process 1208 and a user application 1210. The host computing device is connected to a GPU 1214 via a peripheral component interconnect bus 1212. The GPU has a software stack comprising firmware 1216 and code and data 1218. The hardware of the GPU comprises a internal bus 1220, a peripheral component interconnect (PCI) control engine 1232, a command processor 1230, a copy engine 1222, a memory controller 1226, a memory 1224 and a compute engine 1228. The compute engine 1228 comprises a plurality of graph processing clusters (GPCs) a level two cache. Each GPC comprises a plurality of streaming multi-processors (SMs).

A user-space application uses an API provided by the user-space GPU runtime (e.g., CUDA runtime), to program the GPU execution units with a piece of code known as a kernel, and transfer data between host and device memory. The GPU runtime converts each API call to a set of GPU commands for configuring the device and controlling kernel launches and data transfers. The device driver consists of a user-space component that acts as a wrapper to the kernel-space component. The kernel-space GPU driver is responsible for submitting commands to the GPU via the PCI bus and for managing device memory.

The GPU interfaces with the host CPU 1200 via the PCI control engine 1232, which is connected with the rest of the GPU components via an internal bus 1220. Notable components are the command processor 1230, the compute 1228 and copy engines 1222 (DMA), and the memory system, including the memory controller 1226 and memory chips 1224. GPU engines may be controlled by micro-controllers that execute firmware 1216, which is loaded when the device boots.

The PCI control engine 1232 consists of (a) a PCI controller that receives incoming and outgoing PCI transactions, and (b) a master control engine, which exposes a set of memory-mapped-IO (MMIO) registers that are accessed by the host CPU to enable and disable the GPU engines. The command processor 1230 (aka channel engine) receives commands submitted by the device driver over as set of command queues known as channels and forwards them to the corresponding engines once they are idle. Channels are configured through a set of memory locations known as the channel control area which is mapped over the MMIO and serviced by the command processor 1230.

The compute engine 1228 consists of a set of graph processing clusters (GPCs) and a shared L2 cache. Each GPC consists of a number of streaming multiprocessors (SMs), which are used to run GPU kernels. Each SM consists of multiple cores and a private memory hierarchy, including a read-only cache, L1 cache, and application-managed memory. GPU kernels specify the number of threads to be created (organized in blocks and grids). However, the unit of scheduling on each SM is a warp. Threads belonging to the same warp share the caches and the application-managed memory.

Execution on GPUs is context-based. A context is the collection of resources and state (memory, data, etc.) that are required to execute a kernel (which is a piece of code). Resources are allocated to contexts to run a compute task and are freed when context is destroyed. Each context has its own address space. GPUs use channels to isolate a context's address space from other contexts. A channel is the only way to submit commands to the GPU. Therefore, every GPU context allocates at least one GPU channel.

Figure 13:
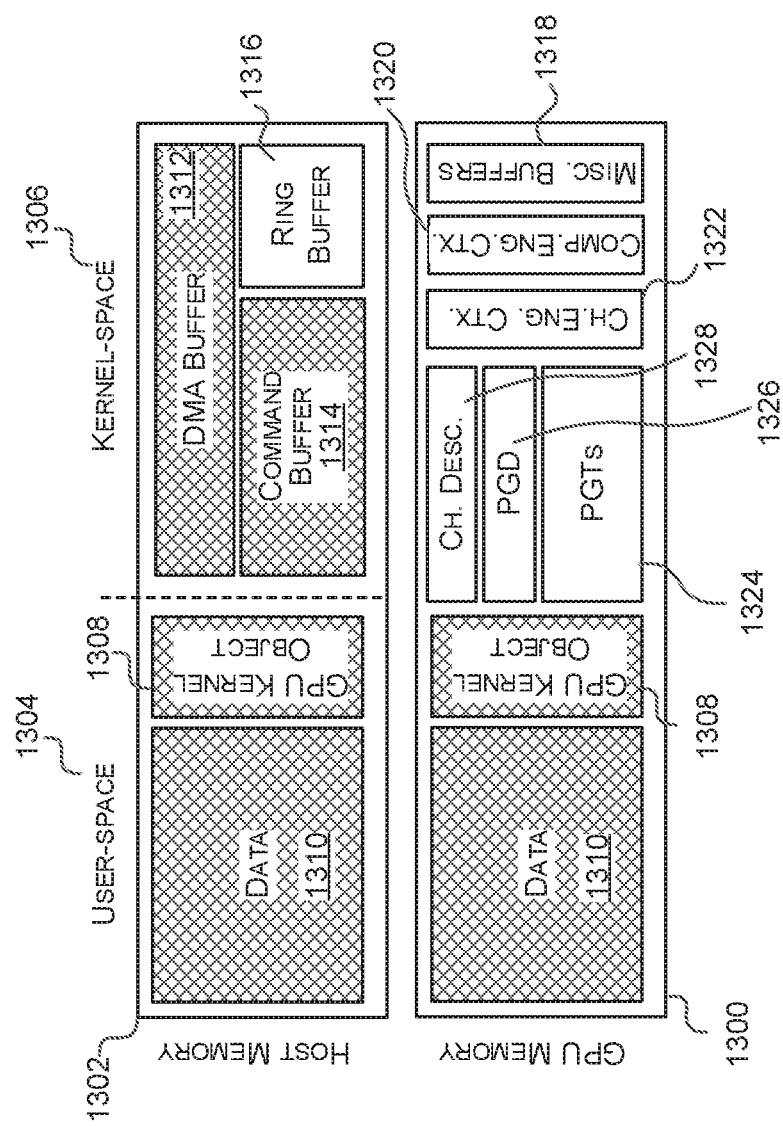
FIG. 13 is a schematic diagram of host memory and graphics processing unit memory spaces.

FIG. 13 shows GPU memory and host memory. The host memory 1302 comprises memory for a user-space 1304 and kernel space memory 1306. The user space memory 1304 comprises data 1310, a GPU kernel object 1308. The kernel space memory 1306 comprises a direct memory access (DMA) buffer 1312, a command buffer 1314 and a ring buffer 1316.

The GPU memory comprises data 1310, a GPU kernel object 1308, a channel descriptor 1328, a page directory 1326, page tables 1324, a channel engine controller 1322, a comp engine controller 1320, and miscellaneous buffers 1322.

Figure 14:
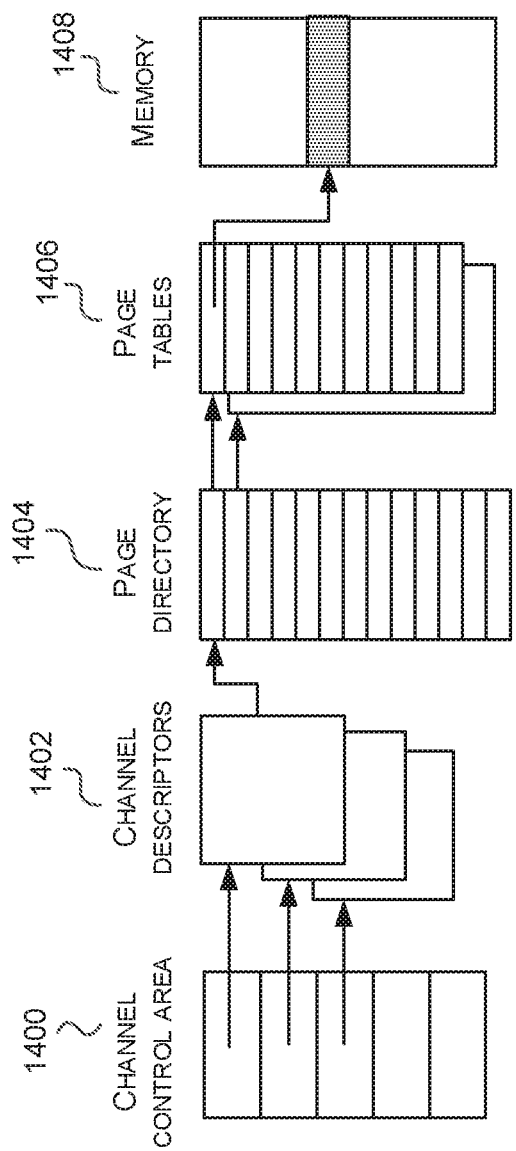
FIG. 14 is a schematic diagram of channel-level address space management.

FIG. 14 illustrates channel-level address space management. A channel control area 1400 has pointers to channel descriptors 1402. A channel descriptor has a pointer to a page directory 1404. A page directory points to one or more page tables 1406. A page table entry points to a memory location 1408.

To create a channel, the device driver allocates a channel descriptor 1402 and a two-level page table 1406 in device memory. The two-level page table consists of the page directory (PGD) 1404 and a number of leaf page tables (PGT) 1406. The driver writes the channel descriptor 1402 address to the channel control area, and the page directory address in the channel descriptor 1402. The page directory 1404 consists of entries that point to leaf page tables 1406, and leaf page tables 1406 contain virtual-to-physical mappings. The page table supports small (4K) and big pages (128K), which is indicated by a bit in the page table entry. The device driver updates all these data structures over the PCI bus.

Once the channel is created, the device driver allocates device memory for (a) storing the internal state of the channel and the compute engines on a channel switch, (b) a fence buffer used for synchronization between the host CPU and GPU, and (c) an interrupt buffer for transferring interrupts generated by the GPU engines to the host.

Figure 15:
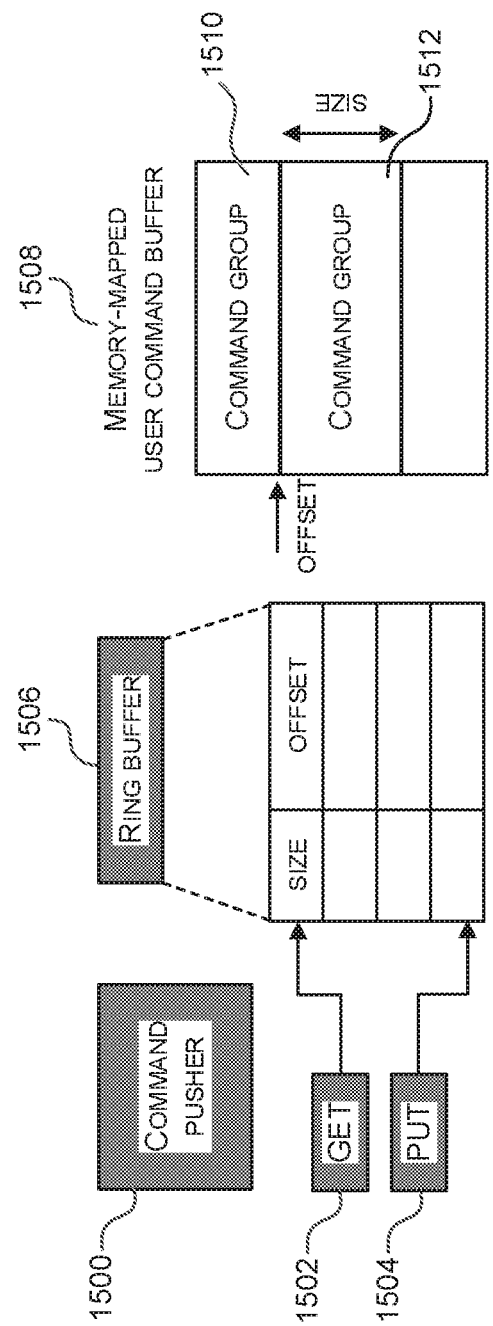
FIG. 15 is a schematic diagram of command submission to a peripheral device package.

The command processor 1230 is responsible for fetching commands submitted by the software stack and relaying them to the appropriate GPU engines. FIG. 15 shows the data structures created for command submission including ring buffer 1506 and memory-mapped user command buffer 1508. The driver allocates command 1508 and ring buffers 1506 in kernel-space. The command buffer 1508 is memory-mapped to the user runtime memory space. The runtime (command pusher 1500) pushes groups of commands to the command buffer 1508, updates the channel's ring buffer 1506 with the size and offset of each group, and then updates the PUT pointer over MMIO. When the PUT register 1504 is updated, the command processor 1230 fetches a command group 1510, 1512 from the buffers, and updates the GET register 1502 to notify the runtime that the commands have been received.

To aid understanding of the technology, major stages of dispatching GPU kernels to the GPU are now described.

An application wishing to use the GPU first creates a context such as a CUDA (trade mark) context. During the context creation, the runtime allocates a DMA buffer for data transfers between host memory and device memory as illustrated in FIG. 13. Subsequently, the application loads one or more CUDA (trade mark) modules into the context. For each kernel defined in the module, the runtime creates a corresponding kernel object on the GPU by allocating device memory for (a) the kernel's code, (b) constant memory used by the kernel, and (c) local memory used by each thread associated with the kernel. The runtime then copies code and constant memory to device memory via DMA.

The application then allocates device memory for storing inputs and outputs of a kernel using a memory allocation API. Memory allocations are serviced by the driver, which updates the page directory and page tables accordingly.

When the application issues a host-to-device copy, the runtime pushes a command group to the context's channel, passing the virtual addresses of source and destination to the copy engine. Once the copy engine is configured, it translates source and destination addresses to physical addresses and initiates DMA transfers.

When the application executes a kernel, the runtime pushes a command group that includes the kernel's context, the base address of the code segment, the entry program counter, the grid configuration, and the kernel's environment, which includes the stack and parameters values.

A GPU can be used to execute multiple kernels from multiple host processes using techniques such as pre-emptive multi-tasking, spatial multi-tasking, simultaneous execution, multi-process service, or virtualization. In such scenarios, it is the responsibility of the host (driver) to isolate kernels using the channel abstraction and virtual memory. Even in devices that partition resources in hardware, system software is still responsible for assigning virtual devices to virtual machines.

Consider a strong adversary who controls the entire system software (including the operating system, device drivers and the hypervisor), and has physical access to all server hardware, including the GPU. Clearly, such an adversary can read and tamper with code or data of any victim process. The adversary can also access or tamper with user data in DMA buffers or with commands submitted by the victim application to the GPU. This gives the adversary control over attributes the address of kernels being executed, and parameters passed to the kernel. The adversary may also access device memory directly over MMIO, or map a user's GPU context memory space to a channel controlled by the adversary. In multitasking GPUs, malicious kernels can be dispatched to the GPU, thereby accessing memory belonging to a victim's context. These attacks are possible even in a virtualized environment e.g. even if a device supports SR-IOV because the mapping between VMs and virtual devices is controlled by the hypervisor.

An adversary with physical access to the server can mount snooping attacks on the host memory bus and the peripheral component interconnect bus. In examples described herein TEEs are used to host the user application and the GPU runtime. Unlike host memory, which is untrusted, on-package GPU memory is trusted since GPU cores are attached to memory using silicon interposers or through-silicon technology, which make it extremely difficult for an attacker to mount snooping attacks.

Even under this threat model, examples described herein enable confidentiality and integrity for applications using the GPU. Examples enable secure transfer of code and data to/from the GPU by a trusted user application (e.g. running in a TEE such as a CPU enclave or an on-premise machine) and that the secure transfer cannot be observed or tampered by the adversary. The computation on the GPU proceeds without interference from the adversary.

In existing GPUs, the responsibility of managing device resources, such as memory, lies with the device driver. For example, when allocating memory for an application object, the driver determines the virtual address at which to allocate the object, then determines physical pages to map to the virtual pages, and finally updates virtual-physical mappings in the channel's page tables (over MMIO). This mechanism creates a large attack vector. A compromised driver can easily violate channel-level isolation—e.g., by mapping a victim's page to the address space of a malicious channel.

One way of preventing such attacks and achieving isolation is to statically partition resources between channels. However, this will lead to under-utilization of resources and will not permit low-cost sharing of resources between channels, which is used to implement features like streams. Instead of static partitioning, examples described herein give isolation of secure contexts by imposing a strict ownership discipline over resources in hardware, while allowing the driver to dynamically partition resources. Specifically, hardware changes to a GPU are made that enforce the following invariants, which together imply isolation.

Invariant 4.1 A physical page mapped to a secure channel associated with a secure context (i.e. a public key) cannot be mapped to a channel associated with a different context.

Invariant 4.2 A physical page mapped to a secure channel that contains sensitive information cannot be unmapped without authorization.

Invariant 4.3 All physical pages mapped to a secure channel that contain sensitive information are not accessible over MMIO to untrusted software on the host CPU.

Objects (code and data) allocated in a secure context and address space management structures (i.e. channel descriptor, page directory and page tables) of a secure context are regarded as sensitive. Hardware extensions for enforcing these invariants are now explained.

A first extension is to partition device memory into three regions, unprotected, protected and hidden, each with different access permissions.

The unprotected region is a region in memory that is both visible and accessible from the host (via peripheral component interconnect base address registers). The driver can use this region to allocate channels that do not require security, and non-sensitive objects (e.g., synchronization and interrupts buffers) that are accessed over MMIO. This region can be accessed also from the compute and copy engines.

The protected region is visible to but not accessible from the host. In other words, the driver can allocate objects within the region (by creating page mappings), but cannot access the region directly over MMIO. Thus, this region can be accessed only the GPU engines.

The hidden region is not visible or accessible to host CPU or the graph engines on the GPU. Pages in this region are not accessible over peripheral component interconnect and are not mapped into any channel's virtual address space. This region is reserved for use by the command processor for maintaining metadata such as ownership state of protected memory pages and per-channel encryption keys.

The memory regions are implemented using range checks on every MMIO access and on commands that update address translations in the peripheral component interconnect control engine and the command processor, respectively. The sizes of these regions are configured during initialization by untrusted host software. The sizes do not affect security, only availability e.g. the administrator can block creation of secure contexts by allocating a very small protected region.

To prevent a malicious driver from violating Invariant 4.1 and Invariant 4.2. decoupling is done between the task of allocating and deallocating virtual and physical memory and the task of managing device-memory-resident address translation data structures (i.e., page directories and page tables), and by delegating the latter to the GPU's command processor. The driver is able to decide where in virtual and physical memory an object will reside. However, the driver is required to route requests to update page directories and page tables through the command processor using the commands described with reference to FIGs. to 10. The implementation of the API in the command processor enforces the invariants by tracking ownership of physical pages in the protected region in a data structure called the Protected Resource Metadata (PRM). The PRM is now described for an example where the resources are pages of memory. Note that this example is extendible to situations where resources of other types are used.

The PRM is a data structure located in hidden memory, making it invisible to the host. In an example, it is indexed using the physical address of a memory page. Pages are tracked at the granularity of a small page (i.e., 4 KB). The PRM maintains the following attributes for each physical page.

The attribute owner_id is the channel that owns the page, represented by its identifier.

The attribute state $\in$ {FREE, MAPPED} represents whether the page is free or already mapped to some channel. FREE is the default value.

The attribute ref count tracks the number of channels a physical page has been mapped to.

The attribute lock $\in$ {UNLOCKED, LOCKED} represents whether the page requires explicit authorization to be unmapped.

The attribute pgd_index is an index into the page directory that points to the page table containing the mapping for the current page. Using this attribute, the command processor can reconstruct the virtual address of a physical page. In that sense, the PRM acts as an inverted page table for the protected region.

The attribute pgt_entrycnt is a 2-byte value that tracks the number of pages table entries allocated within a page table. Using this attribute, the command processor knows if a locked page table is empty and hence may be unmapped.

The attribute "pgt_type". The attribute pgt_type tracks whether the page belongs to a page table for big or small pages. This attribute is set for the pages of the page table when updating a page directory entry with a page table address. The attribute is read when a page table entry is updated with an allocated object so as to know how many secure page entries need to be updated. For example, when a big page table is updated, the update covers 128 KB of address space, and hence 32 PMM entries are to be updated.

In an example, assuming each PRM entry requires 72-bits, the total size of the PRM for a GPU with 3 GB physical memory is 6 MB, which is ~0.2% of total memory.

Introducing a command-based API for address-space management raises the following issue: How does the driver send commands for managing the address space of secure channels without having access to the channel-specific CEK? This is overcome by enabling the driver to use a separate channel, which we refer to as a bootstrap channel (see 1602 of FIG. 16), for routing commands for address-space management of all other channels. The driver creates and configures the bootstrap channel over MMIO 1601 and allocate its own address-space management structures in the unprotected region. To ensure that the driver does not use the bootstrap channel to violate isolation of other (secure) channels, the command processor prohibits the bootstrap channel 1602 from issuing commands to the copy and compute engines since such commands can be used to access sensitive state. To ensure that the driver does not use the bootstrap channel to violate isolation of other (secure) channels, the command processor allows execution of only the resource management commands (such as address-space management commands or other resource management commands) to ensure that other commands executed in the command processor cannot access sensitive state.

Figure 16:
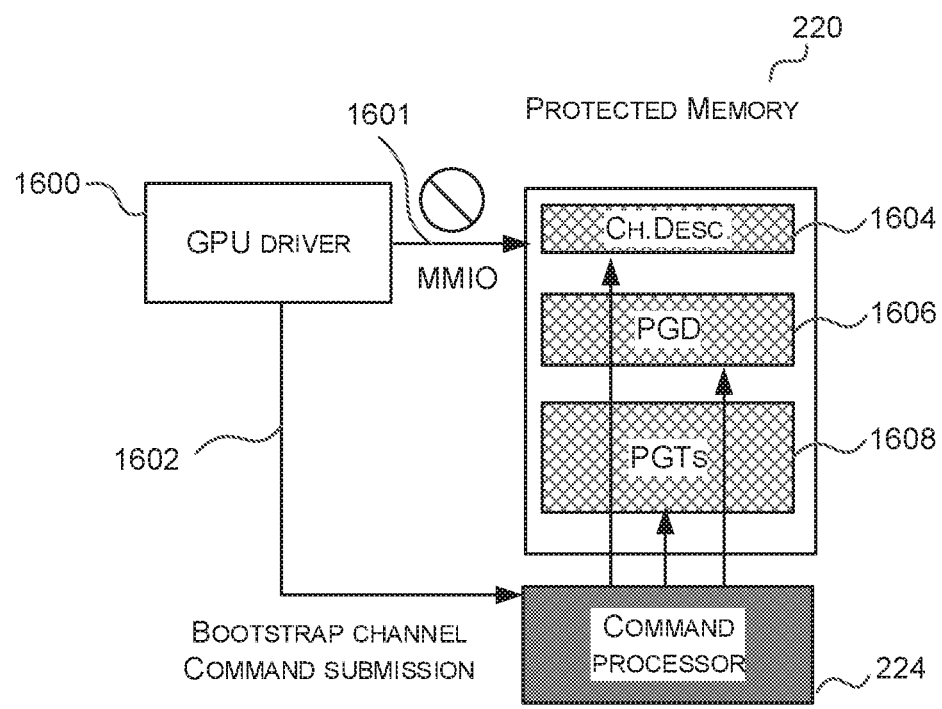
FIG. 16 is a schematic diagram of a bootstrap channel between a driver and a command processor.

With reference to FIG. 16, the bootstrap channel 1602 is an instance of a class of channels that the driver 1600 creates for configuration purposes. These channels are referred to as configuration channels. The command processor identifies configuration channels as follows. The command processor's logic that intercepts MMIO 1601 writes to the channel descriptor 1604 attribute in the channel control area is extended. The command processor 224 has access to the page tables 1608, page directory 1606 and channel descriptor 1604. If the address being written to this attribute is in the unprotected region, the corresponding channel is marked as a configuration channel in an array stored in the command processor's 224 SRAM. The command processor 224 uses this array to determine if it should forward commands from the channel to the copy or compute engines. For the configuration channels, the command processor is allowed to execute only resource management commands (such as address-space management commands) to ensure that other commands available in the command processor cannot access sensitive state. The array is also used during CH_CREATE to ensure that secure channels have their channel descriptors allocated in the protected region.

When a command fails, the command processor writes the error in an SRAM register that is accessible by the device driver over MMIO. This allows the device driver to take necessary actions so as to guarantee consistent view of a channel's address space between the command processor and the device driver.

In addition to isolating secure channels, hardware support is provided to enforce Invariant 4.3—i.e., all sensitive code and data is allocated in the protected region. The CH_PTE command generates a response that contains the new mappings that have been added to the PTE. The mappings are encoded compactly using the starting virtual address and the number of pages allocated in the protected region. The response also contains the channel identifier and a keyed MAC using the CEK of the channel. In the case where an object spans multiple page tables, the driver collects the response from multiple CH_PTE commands. The driver returns this response back to the user runtime process. The user runtime process, which has access to the CEK, is able to detect if the response has been tampered with or replayed, and verify if the entire object has been allocated in the protected region, and in the right channel.

The command processor enforces Invariant 4.2 by having that each CH_PTE command include as parameters the starting virtual address and size of the object signed by the CEK. The command processor authenticates the parameters and then checks that the range of pages being unmapped lies within the range specified by the parameters. If the check succeeds, the command processor decrements ref count and transitions the page to the FREE state if ref count reduces to 0. Note that the hardware does not clear the contents any pages on allocation and deallocation; the user runtime process clears the pages.

A set of primitives that use secure contexts to transfer sensitive kernels and data to the peripheral device and launch kernels while guaranteeing confidentiality and integrity are now described.

Figure 17:
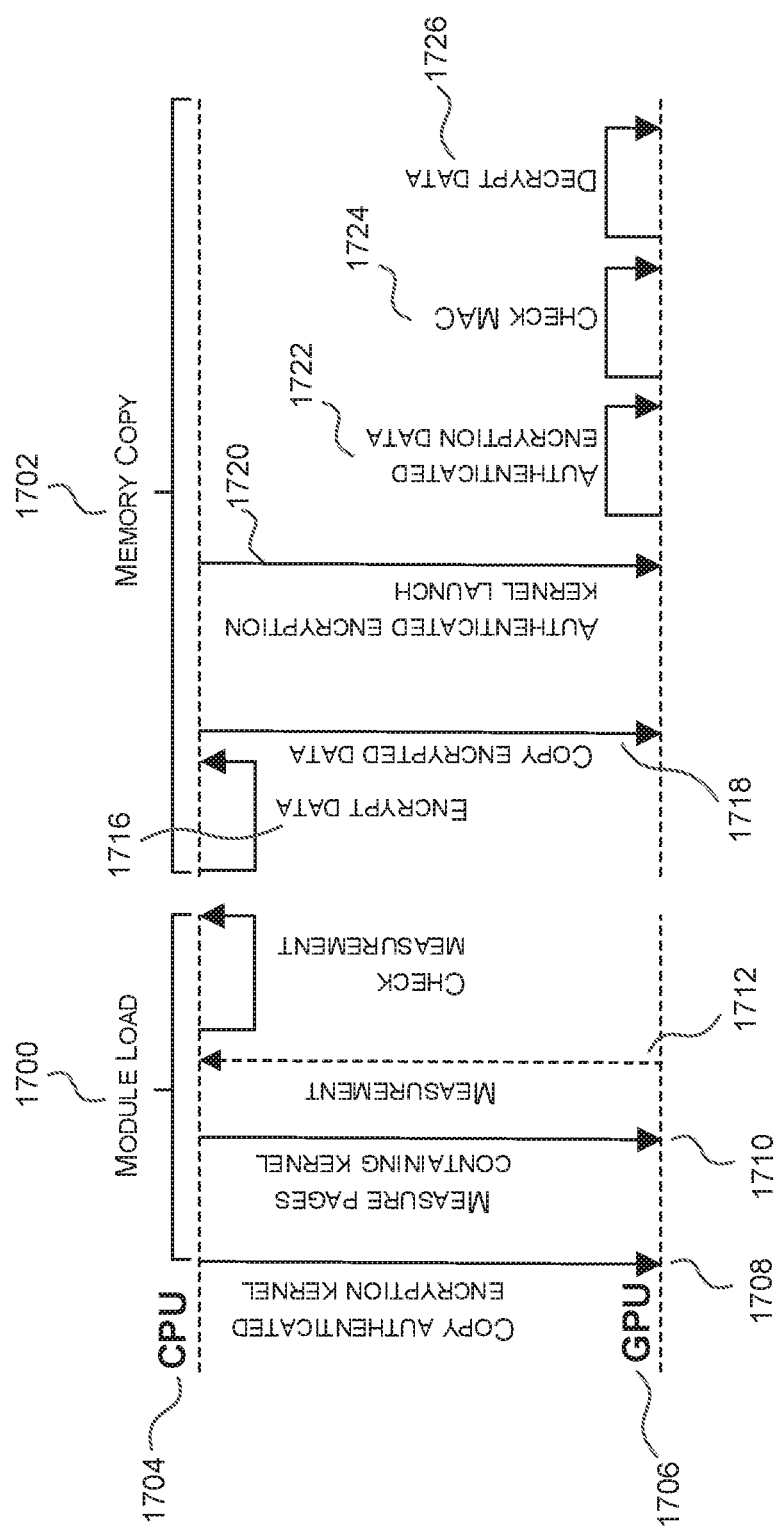
FIG. 17 is a sequence chart of a secure memory copy protocol.

The peripheral device runtime supports a new primitive (cudaSecureMemcpy) for securely copying code and data from trusted host memory (i.e., enclave memory) to device memory and vice versa. FIG. 17 illustrates the protocol used by the primitive.

After a secure context has been created, the user runtime process initiates a DMA to copy 1708 to the context's memory at the peripheral device such as a GPU 1706 a kernel that performs authenticated decryption and its constant memory. The kernel is copied in cleartext (since it is publicly known anyway). The user runtime processes sends a measurement command 1710 to the command processor to ensure that the kernel is correctly copied by comparing 1714 the digest included in the measurement 1712 with a digest of the kernel computed in host TEE memory.

On receiving a request for secure memory copy, the user process runtime encrypts 1716 the data to be copied using a fresh symmetric key within a CPU TEE, and copies the encrypted data to untrusted memory in the host.

The user runtime process uses secure memory allocation to allocate device memory in the protected region for the encrypted data, and initiates a DMA to transfer 1718 encrypted data to this memory. The command group that initiates the DMA is issued using the secure context, and therefore is encrypted and integrity protected using the CEK.

The peripheral device runtime uses the kernel to authenticate 1722 and decrypt data on the peripheral device. To do so, it issues a command group to launch the kernel, passing the address of the data, the data encryption key, and the expected MAC as the kernel's parameters.

The peripheral device authenticates the encrypted data and generates a MAC which is checked 1724 against the expected MAC, and finally decrypts 1726 the data in device memory, overwriting the encrypted data in the process.

An attribute of secure memory copy is crypto-agility. Since the primitive is implemented fully in software, the runtime may support various encryption and authentication schemes without hardware changes.

Secure kernel launch (cudaSecureKernelLaunch) utilizes secure copy to transfer a given kernel's code and constant memory to the peripheral device, and then issues a command group to launch the kernel, passing parameter values. The command processor is modified to disable preemption for kernels submitted through a secure channel. The combination of secure copy and no preemption ensures that a kernel completes with no information leakage or tampering. When preemption is to be supported, the command processor saves the context of the preempted kernel in the hidden memory, and resets registers and application-managed memory. Subsequently, a different kernel starts execution. To switch back, the command processor reads and restores the state from the hidden memory.

CUDA (trade mark) streams is a primitive used to overlap host and peripheral device computation, and input/output (I/O) transfers. Each stream is assigned a separate channel, with each channel sharing the same address space, to enable concurrent and asynchronous submission of independent tasks. The technology described herein naturally supports secure streams (cudaSecureStreamCreate) by allowing channels within the same context to share pages.

Empirical results are now described which demonstrate the effectiveness of the technology described herein. In an example the well known Caffe framework was used to train a neural network using technology as described herein on the well known Cifar-10 dataset, which consists of 60000 32×32 images in 10 classes. The neural network comprises 11 layers: 3 layers of convolution, pooling, rectified linear unit non-linearities (RELU) followed by local contrast normalization and a linear classifier. 10000 training iterations were run (for a batch size of 200) and the neural network was tested every 250 iterations using 10000 images. For testing, two different batch sizes were evaluated (200 and 400). The neural network was found to have the same accuracy whether trained using the technology described herein or using conventional technology.

Figure 18:
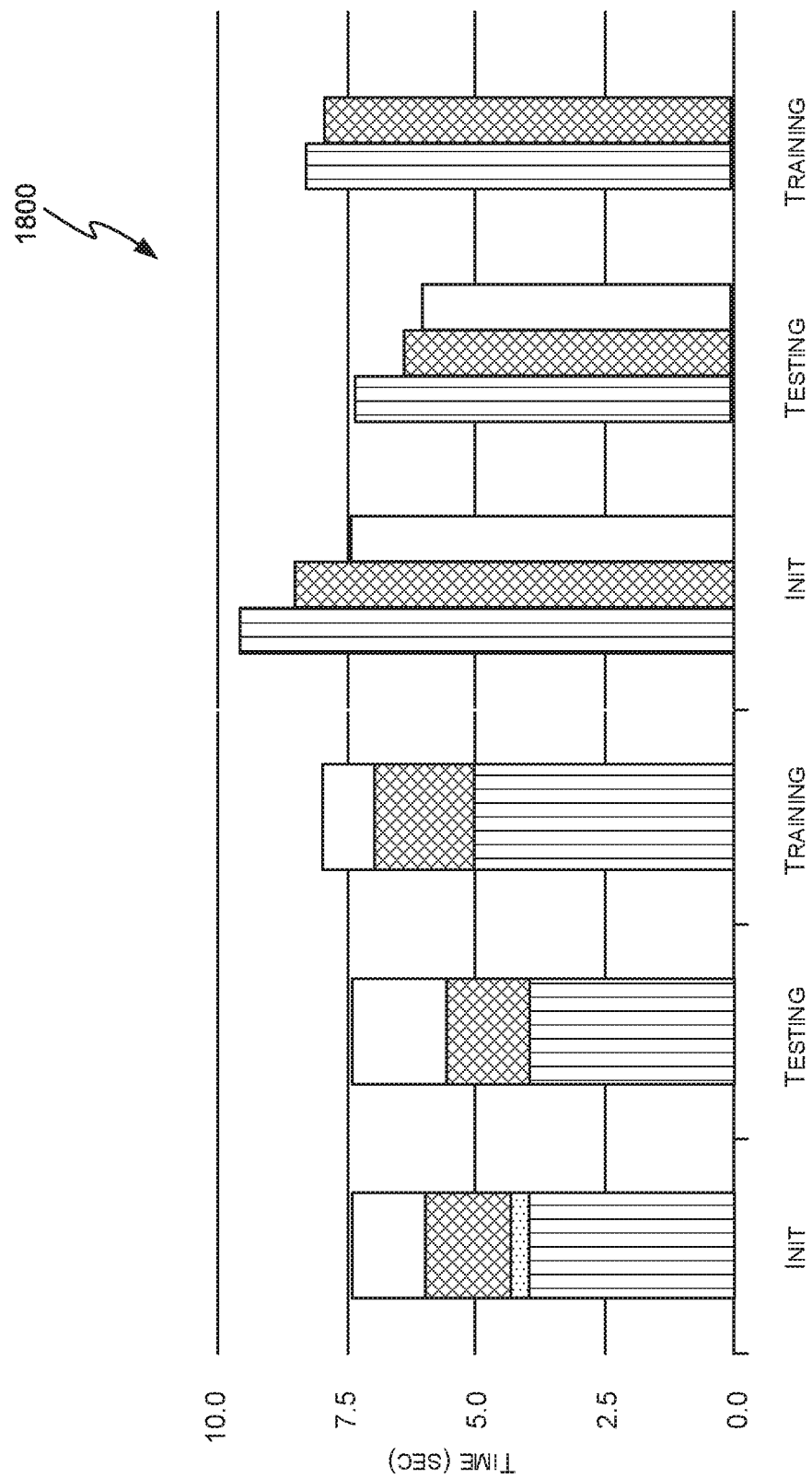
FIG. 18 is a graph of Cifar-10 performance.

FIG. 18 (left) shows the present technology's impact on execution time for a batch size of 200 for training and 400 for testing for three phases of execution—i.e. initialization, testing and training. In FIG. 18 the vertical line filled areas represent the baseline, the dotted filled areas represent isolation, the cross hatched areas represent command authorization, and the unfilled areas represent secure copy. For training, execution time is reported for 25 iterations averaged across all iterations. The overhead is broken down into three buckets, isolation (i.e., using the command based API), command encryption/authentication, and secure memory copy. Each of these phases slow down by 90%, 56% and 39%, respectively. For the entire execution, the overhead is 40% as training accounts for more than 93% of the time.

The overheads during initialization are due to secure context and module creation for enforcing isolation (11% of the overhead), secure copy of the model and data used for the initial test (41% of the overhead), and finally one testing phase, which accounts for 48% of the overhead due to command group authentication.

The breakdown of testing and training overheads shows that that command group encryption/authentication accounts for 58% and 78% of the overhead respectively. This is because this workload executes a large number of relatively short kernels (one for each batch and layer). Profiling the time spent on kernel launches, indicates that around 80% of the overhead is due to emulated authenticated decryption. In particular, each launch incurs a 9 μsec latency, with 0.7 μsec on encryption in the runtime, and 2.8 μsec on decryption in the emulator. This overhead may be substantially reduced if the command processor has access to a hardware cryptographic engine.

Pipelining in Caffe was implemented to overlap the host-side authenticated encryption of a batch with execution of the previous batch on the GPU. FIG. 18 (right) shows the impact of pipelined secure copy. Vertical line filled regions represent batch 200, cross hatched regions represent batch 200 opt, and unfilled regions represent batch 400 opt. It is found that the overheads reduce as the batch size increases; this is because there is more room for overlap.

Figure 19:
FIG. 19 is a graph of Black-Scholes execution time.

The well known Black-Scholes process was run with 10 batches of 4 million options and 2500 iterations each. As shown in FIG. 19, (where vertical line filled regions represent execution, dotted filled regions represent allocation and unfilled regions represent copy) the first batch incurs a higher overhead (44%) due to the cost of secure module loading and secure memory copy. Subsequent batches incur smaller overheads (35% on average) as no modules are loaded. Unlike Cifar-10, command authentication is not a factor in Black-Scholes as it executes one long-running kernel per batch.

Alternatively or in addition to the other examples described herein, examples include any combination of the following:

Clause 1. A peripheral device package for use in a host computing device, the peripheral device package comprising:
 a plurality of compute elements;
 a plurality of resources shared by the plurality of compute elements;
 a datastructure stored in a hidden memory of the peripheral device package, the data structure holding metadata about ownership of resources of the peripheral device package by a plurality of user runtime processes of the host computing device which use the compute elements, at least one of the user runtime processes being a secure user runtime process;
 a command processor configured to use the datastructure to enforce isolation of the resources used by the secure user runtime process.

Clause 2. The peripheral device package of clause 1 wherein the command processor receives commands from the user runtime processes via a driver of the peripheral device package, the driver being in the host computing device, and wherein the command processor receives the commands after specification of resources in the commands made by the driver; and wherein the command processor is configured to return responses to the received commands for authentication by the user runtime process.

Clause 3. The peripheral device package of clause 1 comprising:
 one or more silicon interposer layers supporting the compute elements, memory and the command processor; and
 a trust root integrated into silicon of the device package, the trust root being suitable for generating attestation keys for validation using a trusted certification authority, such that where the user runtime process is trusted, the user runtime process is able to trust the peripheral device, via the host which is untrusted.

Clause 4. The peripheral device package of clause 1 wherein the command processor is configured to use the datastructure to ensure trusted execution of the secure user runtime process on the peripheral device by, when a request is received to create a secure channel on the peripheral device package, for use by the secure user runtime process, checking the datastructure to find whether one or more resources associated with the request are protected from direct access by the host, and are free, and if the check fails, failing the request, and if the check succeeds, implementing the request and updating the datastructure.

Clause 5. The peripheral device package of clause 1 wherein the command processor is configured to use the datastructure to ensure trusted execution of the secure user runtime process on the peripheral device by, when a channel page directory entry command is received, unmapping an existing page table and mapping a new page table at a specified index in the page directory of a specified channel, only if checks on the datastructure succeed.

Clause 6. The peripheral device package of clause 5 wherein the checks include, before unmapping, ensuring the existing page table is unlocked or is both locked and has a user-signed authorization; and where the checks include, before mapping a new page table, checking whether the new page table is allocated on pages in a protected region of memory which is not accessible directly by the host, and that the new page table is free.

Clause 7. The peripheral device package of clause 1 wherein the command processor is configured to use the datastructure to ensure trusted execution of the secure user runtime process on the peripheral device by, when a channel page table entry command is received, removing existing mappings from a specified page table entry and creating new mappings according to a specified array, starting from a specified virtual address and spanning over a specified range, only if checks on the data structure succeed.

Clause 8. The peripheral device package of clause 7 wherein the checks include, before removing an existing page table entry, checking if the physical page is in an unlocked state.

Clause 9. The peripheral device package of clause 8 wherein the checks include, if the existing mappings to be removed are for a locked page, checking for the presence of a message authentication code, MAC, over the channel page table entry command generated using a channel encryption key formed from a root of trust integrated in silicon of the peripheral device package.

Clause 10. The peripheral device package of clause 1 wherein the command processor is configured to use the datastructure to ensure trusted execution of the secure user runtime process on the peripheral device by, when a channel destroy command is received, freeing memory allocated to a specified channel by walking a page directory to find physical pages owned by the channel and clearing their information from the datastructure.

Clause 11. The peripheral device package of clause 10, wherein if the channel to be destroyed is secure, only executing the command if authorization is received comprising a message authentication code, MAC, over the command using a channel encryption key of the channel to be destroyed.

Clause 12. The peripheral device package of clause 10 wherein the command processor is further configured to unmap physical pages of a channel descriptor and page directory of the channel to be destroyed, decrement a counter used for page tables and transition to a free state any pages with a counter which reduces to zero.

Clause 13. The peripheral device package of clause 1 wherein the command processor is configured such that, when a measurement command is received, the command processor computes a verifiable artifact that summarizes the contents of a secure channel.

Clause 14. The peripheral device package of clause 13 wherein the verifiable artifact comprises: a message authentication code, a starting virtual address, and a digest of contents of pages in a specified range.

Clause 15. A computer-implemented secure user runtime process having instructions for execution on a peripheral device package of an untrusted host computing device, the secure user runtime process comprising:

sending commands via the untrusted host to a command processor of the peripheral device package, the commands using a datastructure in a hidden memory of the peripheral device package to enforce isolation of resources of the peripheral device package used by the secure user runtime process.

Clause 16. The computer-implemented secure user runtime process of clause 15 comprising: in response to sending the commands to the control processor, receiving responses and authenticating the responses to ensure that the untrusted host did not tamper with the sent commands.

Clause 17. The computer-implemented user runtime process of clause 15 comprising, a protocol to securely copy sensitive information from a secure memory on the host computing device to the peripheral device package, the protocol comprising copying a kernel that performs authenticated decryption into the peripheral device package, and receiving a digest from the command processor in response, and checking the kernel has been correctly copied by comparing the received digest with a digest of the kernel computed by the host computing device.

Clause 18. The computer-implemented user runtime process of clause 15 comprising securely copying a specified kernel's code and constant memory to the peripheral device package and issuing a command group to launch the kernel.

Clause 19. The computer-implemented user runtime process of clause 15 comprising sending the commands to the untrusted host in encrypted form over a secure session between the user runtime process and the command processor.

Clause 20. A peripheral device package for use in a host computing device, the peripheral device package comprising:

a plurality of compute elements for execution of a plurality of user runtime processes of the host computing device, at least one of the user runtime processes being secure;

a plurality of resources shared by the plurality of compute elements;

a command processor configured to receive commands from the user runtime processes via a driver in the host computing device, and wherein the command processor receives the commands after specification of resources in the commands made by the driver; and wherein the command processor is configured to return responses to the received commands for authentication by the user runtime process.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A peripheral device package for use in a host computing device, the peripheral device package comprising:
   a plurality of compute elements;
   a plurality of resources shared by the plurality of compute elements;
   a datastructure stored in a hidden memory of the peripheral device package, the datastructure holding metadata about ownership of resources of the plurality of resources of the peripheral device package by a plurality of user runtime processes of the host computing device which use compute elements of the plurality of compute elements, at least one of the user runtime processes being a secure user runtime process, wherein the hidden memory is not mapped to virtual address space of the host computing device;
   a command processor configured to determine based on a check on the metadata, a resource allocation approval to enforce isolation of the resources used by the secure user runtime process.

2. The peripheral device package of claim 1 wherein the command processor receives commands from the user runtime processes via a driver of the peripheral device package, the driver being in the host computing device, and wherein the command processor receives the commands after specification of resources in the commands made by the driver; and wherein the command processor is configured to return responses to the received commands for authentication by the user runtime process.

3. The peripheral device package of claim 1 comprising:
   one or more silicon interposer layers supporting the compute elements, memory and the command processor; and
   a trust root integrated into silicon of the device package, the trust root being suitable for generating attestation keys for validation using a trusted certification authority, such that where the user runtime process is trusted, the user runtime process is able to trust the peripheral device, via the host which is untrusted.

4. The peripheral device package of claim 1 wherein the command processor is configured to use the datastructure to ensure trusted execution of the secure user runtime process on the peripheral device by, when a request is received to create a secure channel on the peripheral device package, for use by the secure user runtime process; checking the datastructure to find whether one or more resources associated with the request are protected from direct access by the host, and are free, and if the check fails, failing the request, and if the check succeeds, implementing the request and updating the datastructure.

5. The peripheral device package of claim 1 wherein the command processor is configured to use the datastructure to ensure trusted execution of the secure user runtime process on the peripheral device by, when a channel page directory entry command is received, unmapping an existing page table and mapping a new page table at a specified index in the page directory of a specified channel, only if checks on the datastructure succeed.

6. The peripheral device package of claim 5 wherein the checks include, before unmapping, ensuring the existing page table is unlocked or has a user-signed authorization; and where the checks include, before mapping a new page table, checking whether the new page table is allocated on pages in a protected region of memory which is not accessible directly by the host, and that the new page table is free.

7. The peripheral device package of claim 1 wherein the command processor is configured to use the datastructure to ensure trusted execution of the secure user runtime process on the peripheral device by, when a channel page table entry command is received, removing existing mappings from a specified page table entry and creating new mappings according to a specified array, starting from a specified virtual address and spanning over a specified range, only if checks on the data structure succeed.

8. The peripheral device package of claim 7 wherein the checks include, before removing an existing page table entry, checking if the physical page is in an unlocked state.

9. The peripheral device package of claim 8 wherein the checks include, if the existing mappings to be removed are for a locked page, checking for the presence of a message authentication code, MAC, over the channel page table entry command generated using a channel encryption key formed from a root of trust integrated in silicon of the peripheral device package.

10. The peripheral device package of claim 1 wherein the command processor is configured to use the datastructure to ensure trusted execution of the secure user runtime process on the peripheral device by, when a channel destroy command is received, freeing memory allocated to a specified channel by walking a page directory to find physical phages owned by the channel and clearing their information from the datastructure.

11. The peripheral device package of claim 10, wherein if the channel to be destroyed is secure, only executing the command if authorization is received comprising a message authentication code, MAC, over the command using a channel encryption key of the channel to be destroyed.

12. The peripheral device package of claim 10 wherein the command processor is further configured to unmap physical pages of a channel descriptor and page directory of the channel to be destroyed, decrement a counter used for page tables and transition to a free state any pages with a counter which reduces to zero.

13. The peripheral device package of claim 1 wherein the command processor is configured such that, when a measurement command is received, the command processor computes a verifiable artifact that summarizes the contents of a secure channel.

14. The peripheral device package of claim 13 wherein the verifiable artifact comprises: a message authentication code, a starting virtual address, and a digest of contents of pages in a specified range.

15. A method for a computer-implemented secure user runtime process having instructions for execution on a peripheral device package of an untrusted host computing device, the method for the computer-implemented secure user runtime process comprising:

sending commands via the untrusted host computing device to a command processor of the peripheral device package, the commands using a datastructure in a hidden memory of the peripheral device package, including metadata stored in the datastructure, to enforce isolation of resources of the peripheral device package used by the secure user runtime process by performing a check on the metadata to determine whether a resource allocation decision is approved, wherein the hidden memory is not mapped to virtual address space of the untrusted host computing device.

16. The computer-implemented secure user runtime process of claim 15 comprising: in response to sending the commands to the control processor, receiving responses and authenticating the responses to ensure that the untrusted host did not tamper with the sent commands.

17. The computer-implemented user runtime process of claim 15 comprising, a protocol to securely copy sensitive information from a secure memory on the host computing device to the peripheral device package, the protocol comprising copying a kernel that performs authenticated decryption into the peripheral device package, and receiving a digest from the command processor in response, and checking the kernel has been correctly copied by comparing the received digest with a digest of the kernel computed by the host computing device.

18. The computer-implemented user runtime process of claim 15 comprising securely copying a specified kernel's code and constant memory to the peripheral device package and issuing a command group to launch the kernel.

19. The computer-implemented user runtime process of claim 15 comprising sending the commands to the untrusted host in encrypted form over a secure session between the user runtime process and the command processor.

20. A host computing device for using a peripheral device package, the host computing device comprising:

memory including:
a plurality of compute elements for execution of a plurality of user runtime processes of the host computing device, at least one of the user runtime processes being secure and having a corresponding compute element stored in a hidden memory not mapped to virtual address space of the host computing device;
a plurality of resources shared by the plurality of compute elements; and
a command processor configured to receive commands from the user runtime processes via a driver in the host computing device, and wherein the command processor receives the commands after specification of resources in the commands made by the driver;
wherein the command processor uses metadata from the hidden memory to enforce isolation of the resources by performing a check on the metadata to determine whether a resource allocation decision is approved, and wherein the command processor is configured to return responses to the received commands for authentication by the user runtime process.

* * * * *